United States Patent
Kudo

(10) Patent No.: US 10,855,080 B2
(45) Date of Patent: Dec. 1, 2020

(54) SYSTEMS AND METHODS FOR GENERATING POWER GENERATION SUPPRESSION CONTROL INFORMATION BY A CONTROL DEVICE

(71) Applicant: NEC Corporation, Tokyo (JP)

(72) Inventor: Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/080,385

(22) PCT Filed: Feb. 29, 2016

(86) PCT No.: PCT/JP2016/056115
§ 371 (c)(1),
(2) Date: Aug. 28, 2018

(87) PCT Pub. No.: WO2017/149618
PCT Pub. Date: Sep. 8, 2017

(65) Prior Publication Data
US 2019/0074693 A1    Mar. 7, 2019

(51) Int. Cl.
G06Q 50/06 (2012.01)
H02J 3/28 (2006.01)
(Continued)

(52) U.S. Cl.
CPC ............ *H02J 3/28* (2013.01); *G05B 15/02* (2013.01); *H02J 3/14* (2013.01); *H02J 3/382* (2013.01); *H02J 7/0013* (2013.01); *H02J 3/003* (2020.01)

(58) Field of Classification Search
CPC .................................................. G06Q 50/06
(Continued)

(56) References Cited

U.S. PATENT DOCUMENTS

2011/0107123 A1* 5/2011 Nishimura ............... H02J 3/32
                                                              713/300
2012/0104753 A1* 5/2012 Nakashima ........... F03D 7/0284
                                                              290/44
(Continued)

FOREIGN PATENT DOCUMENTS

JP    2010-270758    12/2010
JP    4848477        12/2011
(Continued)

OTHER PUBLICATIONS

International Search Report dated May 24, 2016, in corresponding PCT International Application.
(Continued)

*Primary Examiner* — Suresh Suryawanshi
(74) *Attorney, Agent, or Firm* — Finnegan, Henderson, Farabow, Garrett & Dunner, L.L.P.

(57) ABSTRACT

To efficiently utilize power generated by a renewable energy power source performing output suppression, Provided is a control device (10) including: a first calculation unit (181) that calculates a total excess output in a plurality of power generation devices based on power generation relevant information and an upper limit power generation output in each of the plurality of power generation devices; a second calculation unit (182) that calculates residual excess power information based on the total excess output and storage relevant information in a plurality of energy storage devices absorbing the total excess output; and a transmission unit (191) that transmits power generation suppression control information to each of the plurality of power generation devices based on the residual excess power information.

19 Claims, 25 Drawing Sheets

(51) Int. Cl.
*H02J 3/38* (2006.01)
*G05B 15/02* (2006.01)
*H02J 3/14* (2006.01)
*H02J 7/00* (2006.01)
*H02J 3/00* (2006.01)

(58) Field of Classification Search
USPC .......................................................... 700/291
See application file for complete search history.

(56) References Cited

U.S. PATENT DOCUMENTS

| | | |
|---|---|---|
| 2015/0241896 A1 | 8/2015 | Nishibayashi et al. |
| 2017/0310115 A1* | 10/2017 | Miyake ................. G06Q 50/06 |
| 2018/0041043 A1* | 2/2018 | Kudo ........................ H02J 3/46 |
| 2018/0159335 A1* | 6/2018 | Homma .................... H02J 3/38 |
| 2018/0191162 A1* | 7/2018 | Hanada .................... H02J 7/35 |
| 2018/0375333 A1* | 12/2018 | Matsuo .................... G05B 6/02 |

FOREIGN PATENT DOCUMENTS

| | | |
|---|---|---|
| JP | 2013-005537 | 1/2013 |
| JP | 2015-106937 | 6/2015 |
| JP | 2015-162986 | 9/2015 |
| WO | WO 2011/121815 A1 | 10/2011 |
| WO | WO 2012/147155 | 11/2012 |

OTHER PUBLICATIONS

Okuda et al.; "Output Power Fluctuation Suppression Technology for Photovoltaic Power Generation Systems", Toshiba Review vol. 65 No. 9, pp. 10-14 (2010).

Office Action dated Jan. 21, 2020, issued by the Japanese Patent Office in counterpart Japanese Patent Application No. 2018-502881.

\* cited by examiner

FIG. 4

| POWER GENERATION DEVICE ID | RATED OUTPUT | INSTALLATION POSITION | . . . . |
|---|---|---|---|
| : | : | : | : |

FIG. 5

| ENERGY STORAGE DEVICE ID | TYPE | RATED OUTPUT (w) | RATED CAPACITY (wh) | ADDRESS OF STORAGE CONTROL DEVICE | · · · · |
|---|---|---|---|---|---|
| · · · · | · · · · | · · · · | · · · · | · · · · | · · · · |

FIG. 7

| UNIT PERIOD OF TIME | | UPPER LIMIT POWER GENERATION OUTPUT |
|---|---|---|
| 13:00 ~ 13:30 | — | 80% |
| 13:30 ~ 14:00 | — | 80% |
| 14:00 ~ 14:30 | — | 70% |
| 14:30 ~ 15:00 | — | 80% |

INSTRUCTION TO SUPPRESS POWER GENERATION

FIG. 8

(POWER GENERATION DEVICE 60)
  RATED OUTPUT : 500kW (10 DEVICES), 400kW (5 DEVICES)

$\Rightarrow$ UPPER LIMIT OF TOTAL EXCESS OUTPUT AND
UPPER LIMIT OF TOTAL EXCESS POWER AMOUNT 13:00 ~ 13:30 : 500 × 0.2 × 10+400 × 0.2 × 5 = 1400 kW : 700kWh 13:30 ~ 14:00 : 500 × 0.2 × 10+400 × 0.2 × 5 = 1400 kW : 700kWh 14:00 ~ 14:30 : 500 × 0.3 × 10+400 × 0.3 × 5 = 2100 kW : 1050kWh 14:30 ~ 15:00 : 500 × 0.2 × 10+400 × 0.2 × 5 = 1400 kW : 700kWh

FIG. 9

(ENERGY STORAGE DEVICE 30)

OUTPUT AND
CAPACITY : 5kW · 6kWh (200 DEVICES), 4kW · 5kWh (100 DEVICES)

⇒ TOTAL OUTPUT AND TOTAL CAPACITY 1400kW · (1700kWh)

ALLOCATE

| UNIT PERIOD OF TIME | | CHARGING/ CONSUMPTION OF POWER AMOUNT (UPPER LIMIT) | | RESIDUAL EXCESS POWER AMOUNT | | OUTPUT UPPER LIMIT |
|---|---|---|---|---|---|---|
| 13:00 ~ 13:30 | — | 500kWh | — | 200kWh | — | $\frac{33}{35}$ |
| 13:30 ~ 14:00 | — | 500kWh | — | 200kWh | — | $\frac{33}{35}$ |
| 14:00 ~ 14:30 | — | 500kWh | — | 550kWh | — | $\frac{59}{70}$ |
| 14:30 ~ 15:00 | — | 200kWh | — | 500kWh | — | $\frac{6}{7}$ |

FIG. 10

(ENERGY STORAGE DEVICE 30)
OUTPUT AND
CAPACITY   5kW · 20kWh (200 DEVICES), 4kW · 20kWh (100 DEVICES)
⇒ TOTAL OUTPUT AND TOTAL CAPACITY  1400kW · 6000kWh

| UNIT PERIOD OF TIME | CHARGING/ CONSUMPTION OF POWER AMOUNT (UPPER LIMIT) | RESIDUAL EXCESS POWER AMOUNT | RESIDUAL EXCESS OUTPUT | OUTPUT UPPER LIMIT |
|---|---|---|---|---|
| 13:00 ~ 13:30 | 700kWh | 0kWh | 0kW | 1.0 |
| 13:30 ~ 14:00 | 700kWh | 0kWh | 0kW | 1.0 |
| 14:00 ~ 14:30 | 1050kWh | 0kWh | 700kW | 0.9 |
| 14:30 ~ 15:00 | 700kWh | 0kWh | 0kW | 1.0 |

FIG. 13

[13:00 ~ 13:30 : TOTAL EXCESS POWER AMOUNT 200kWh] ⇒ (300kWh REMAINS)

| UNIT PERIOD OF TIME | CHARGING/ CONSUMPTION OF POWER AMOUNT (UPPER LIMIT) | RESIDUAL EXCESS POWER AMOUNT | OUTPUT UPPER LIMIT |
|---|---|---|---|
| 13:30 ~ 14:00 | 500kWh | 200kWh | $\frac{33}{35}$ |
| 14:00 ~ 14:30 | 500kWh | 550kWh | $\frac{59}{70}$ |
| 14:30 ~ 15:00 | 200kWh (+300kWh) | 200kWh | $\frac{33}{35}$ |

ALLOCATE

FIG. 17

(ENERGY STORAGE DEVICE 30)

OUTPUT AND
CAPACITY : 5kW · 6kWh (200 DEVICES), 4kW · 5kWh (100 DEVICES)

⇒ TOTAL OUTPUT AND TOTAL CAPACITY 1400kW · 1700kWh

| UNIT PERIOD OF TIME | TOTAL EXCESS POWER AMOUNT (UPPER LIMIT) | TOTAL EXCESS OUTPUT (UPPER LIMIT) | SHARING COEFFICIENT |
|---|---|---|---|
| 13:00 ~ 13:30 | 500kWh | 1000kW | $\frac{10}{3}$ |
| 13:30 ~ 14:00 | 500kWh | 1000kW | $\frac{10}{3}$ |
| 14:00 ~ 14:30 | 500kWh | 1000kW | $\frac{10}{3}$ |
| 14:30 ~ 15:00 | 200kWh | 400kW | $\frac{4}{3}$ |

# SYSTEMS AND METHODS FOR GENERATING POWER GENERATION SUPPRESSION CONTROL INFORMATION BY A CONTROL DEVICE

CROSS-REFERENCE TO RELATED PATENT APPLICATIONS

This application is a National Stage Entry of International Application No. PCT/JP2016/056115, file Feb. 29, 2016. The entire contents of the above-referenced application are expressly incorporated herein by reference.

TECHNICAL FIELD

The present invention relates to a control device, a power generation control device, a control method, a system, and a program.

BACKGROUND ART

There are known power generation devices, such as photovoltaic power generation devices or wind power generation devices, generating power using renewable energy (hereinafter also referred to as "renewable energy power sources"). In recent years, renewable energy power sources connected to power systems have increased quickly.

Since outputs of renewable energy power sources fluctuate depending on weather, the outputs are not stable (cannot be planned). Theardfore, when renewable energy power sources connected to a power system increase, it is difficult to keep a supply and demand balance of the power system. When a supply and demand balance in the power sources, it is difficult to keep a frequency or a voltage of the power system within a predetermined range.

Therefore, a technology for alleviating the fluctuation in the outputs of the renewable energy power sources is requested. For example, a technology for suppressing rates of change of the outputs on the renewable energy power source sides so as to be kept within predetermined values (or ranges) was examined, and thus a technology related to Non-Patent Document 1 was disclosed. A technology has been examined for suppressing excess output in generated power of the renewable energy power sources over a predetermined value during a period of time in which there is a concern of a power failure because a supply demand balance considerably collapses beyond a level of a fluctuation in output (oversupply), and its related technology & disclosed in Patent Document 1.

Patent Document 2 discloses photovoltaic power generation system that can suppress system breakdown in a power system and effectively utilize generated power. According, to the same document, the photovoltaic power generation system includes a solar cell module that performs photovoltaic power generation and a measurement unit that measures generated power, and further includes an electric water heater that heats water in response to power supply as an electric device capable of consuming generated power. In the photovoltaic power generation system, when output suppression information used to give an instruction to suppress output is acquired and it is determined that the electric water heater can operate heating, the measurement unit cancels the output suppression of the generated power and calculates use power which is used by the electric water heater.

RELATED DOCUMENT

Patent Document

[Patent Document 1] Japanese Patent Application Publication No, 2013-5537
[Patent Document 2] Japanese Patent Application Publication No. 2015-106937

Non-Patent Document

[Non-Patent Document 1] Toshiba Review, Vol. 65 No. 9 "Output Power Fluctuation Suppression Technology for Photovoltaic Power Generation System", [online], [searched on Dec. 16, 2015], Internet <URL:https://www.toshiba.co.jp/tech/review/2010/09/65_09pdf/a04.pdf>

SUMMARY OF THE INVENTION

Technical Problem

In Patent Document 2, however, when it is determined that the electric water heater can operate the heating, the output suppression of the generated power is cancelled. However, an excess output over power absorbable by causing the energy storage device including the electric water hear installed together to perform charging and/or power consumption may not be absorbed. In this case, the photovoltaic power generation system has to be suppressed immediately. Further, Only a fluctuation in power generation of the photovoltaic power generation system in which the electric wafer heater is installed together is covered. Even when renewable energy power generation such as photovoltaic power generation of another location is lowered and suppression is not necessary as a whole, the power generation may be suppressed. As a result, when the renewable energy power sources such as the plurality of photovoltaic power generation systems receive the output suppression, there is a problem that power generated overall in the plurality of photovoltaic power generation system may not be efficiently utilized. An object of the invention is to provide a technology for solving the foregoing problem.

Solution to Problem

According to an aspect of the invention, there is provided a control device including: a first calculation unit that calculates a total excess output in a plurality of power generation devices based on power generation relevant information and an upper limit power generation output in each of the plurality of power generation devices; a second calculation unit that calculates residual excess power information based on the total excess output and storage relevant information in a plurality of energy storage devices absorbing the total excess output; and a transmission unit that calculates power generation suppression control information based on the residual excess power information and transmits the power generation suppression control information to each of the plurality of power generation devices.

According to another aspect of the invention, there is provided a power generation control device including: a reception unit that receives a total excess output and power generation suppression control information in a plurality of power generation devices of which a power generation output is equal to or greater than an upper limit power generation output; a calculation unit that calculates an excess output which is a difference between an actually measured value of a power generation output and the upper limit power generation output; and, a control unit that controls the power generation output based on a ratio of the excess output to the total excess output and the power generation suppression control information.

According to still another aspect of the invention, there is provided a system including the control device and the power generation control device.

According to still another aspect of the invention, there is provided a control method executed by a computer, the method including a first calculation step of calculating a total excess output in a plurality of power generation devices based power generation relevant information and an upper limit power generation output in each of the plurality of power generation devices; a second calculation step of calculating residual excess power information based on the total excess output and storage relevant information in a plurality of energy storage devices absorbing the total excess output; and a transmission step of transmitting power generation suppression control information to each of the plurality of power generation devices based on the residual excess power information.

According to still another aspect of the invention, there is provided a program causing a computer to execute a first calculation unit that calculates a total excess output in a plurality of power generation devices based on power generation relevant information and an upper limit calculation unit that calculates residual excess power information based on the total excess output and storage relevant information in a plurality of energy storage devices absorbing the total excess output; and a transmission unit that transmits power generation suppression control information to each of the plurality of power generation devices based on the residual excess power information.

As will described in detail in the following example embodiments, "power generation relevant information" is a concept corresponding to a rated output (W) and actual power generation result (W) of each power generation devices.

"Storage relevant information in a plurality of energy storage devices" is a concept corresponding to, for example, a related output (W) and a rated amount (Wh) of each energy storage device. "Residual excess power information" is a concept of corresponding to, for example, a residual excess output (w) and a residual excess power amount (Wh). Definition of the "residual excess output (W)" and the "residual excess power amount (Wh)" will be described in the following example embodiments.

Advantageous Effects of Invention

According to the invention, it is possible to effectively utilize power generated by the plurality of renewable energy power sources performing output suppression.

BRIEF DESCRIPTION OF THE DRAWINGS

The above-described objects, other objects, characteristics, and advantages are further apparent from the following preferred example embodiments and the following appended drawings.

FIG. 4 is a diagram schematically illustrating an example of information registered in the control device according to the example embodiment.

FIG. 5 is a diagram schematically illustrating an example of information registered in the control device according to the example embodiment.

FIG. 7 is a diagram schematically illustrating an example of an instruction to suppress power generation according to the example embodiment.

FIG. 8 is a diagram illustrating a specific example of a process of a power control system according to the example embodiment.

FIG. 9 is a diagram illustrating a specific example of a process of the power control system according to the example embodiment.

FIG. 10 is a diagram illustrating a specific example of a process of the power control system according to the example embodiment.

FIG. 13 is a diagram illustrating a specific example of a process of the power control system according to the example embodiment.

FIG. 17 is a diagram illustrating a specific example of a process of the power control system according to the example embodiment.

DESCRIPTION OF EXAMPLE EMBODIMENTS

Figure 1:
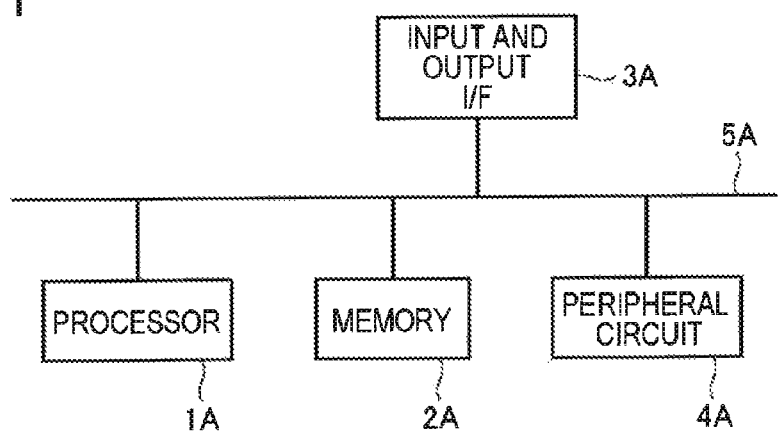
FIG. 1 is a diagram conceptually illustrating an example of a hardware configuration of a device according to an example embodiment.

Hereinafter, example embodiments will be described. Functional block diagrams used to describe the following example embodiments illustrate blocks in functional units rather than configurations in hardware units. In these drawings, each device will be described to be configured by one device, but its configuration means is not limited thereto. That is, each device may be configured to be divided physically or may be configured to be divided logically. The same reference numerals are given to the same constituent elements and the description thereof will not be appropriately repeated.

First Example Embodiments

First, a problem to be solved of the example embodiment win be described. From the viewpoint of effective utilization of renewable energy power, it is preferable not to perform suppression of generated power of renewable energy power sources as much as possible. Accordingly, the inventors have examined a mechanism for charging and/or consumption of excess power generated over an upper limit of the generated power of a renewable energy power source (hereinafter also referred to as an "excess output") by an energy storage device (for example, a secondary battery or a heat pump water heater) in real time when an instruction to suppress power generation in which the upper limit is determined is given.

In particular, the inventors have examined a technology (hereinafter also referred to an "examined technology") for performing real-time charging and/or consumption of a total excess output of a plurality renewable energy power sources distributed in a wide area by a plurality of energy storage devices distributed in a wide area from the viewpoint of effective utilization and a possibility of a flexible scale change of the renewable energy power sources and the energy storage devices. Thus, the following problem has been found.

In the examined technology, charging and/or consumption of a total excess output generated by a plurality of renewable energy power sources is performed by utilizing energy storage devices managed by a plurality of users. In this way, an influence from power generation variations of individual renewable power sources can be alleviated and it is not necessary to prepare a new energy storage device for this process. Thus, it is possible to reduce cost allocation.

However, energy storage devices managed by a plurality of users are used freely by the plurality of users at their discretion. Therefore, when ft is necessary to perform a process of performing charging and/or consumption of a total excess output, a situation in which the energy storage devices for this process cannot be sufficiently ensured can occur.

An object (problem to be solved) of the invention is to solve the problem with a technology for causing a plurality of energy storage devices distributed in a wide area to perform charging and/or consumption of a total excess output of a plurality of renewable energy power sources distributed in a wide area.

First, an overview and a brief outline of a power control system according to an example embodiment will be described with reference to FIG. 2. The power control system according to the example embodiment includes a control device 10, a plurality of energy storage systems 31, and a plurality of power generation devices 60.

The power generation device 60 is a power generation device that generates power using natural energy as solar light, wind power, small hydro power, or terrestrial heat and is a so-called renewable power source. The power generation device 60 may be a large-scale power generation device (for example, mega solar power system) that is managed by a service provider or may be a small-scale power generation device that is managed at a general home.

The power generation device 60 includes a power generation element 62 and an output control device (power generation control device) 61. The power generation element 62 is a photovoltaic battery panel or the like and generates power using natural energy. The output control device 61 includes a power conditioner and a power generation control unit. The power conditioner adjusts power to be supplied from the power generation element 62 to the power system. The power generation control unit controls a power conditioner on the basis of power generation suppression control information received from the control device 10 and suppresses power to be supplied from the power generation element 62 to the power system to a predetermined value or less.

The energy storage system 31 includes a storage control device 20 and an energy storage device 30. The energy storage device 30 is configured to store supplied power as predetermined energy. For example, a secondary battery that stores supplied power as power or an electric vehicle (a secondary battery mounted on an electric vehicle), a heat pump water heater that converts supplied power into thermal energy and stores the thermal energy, and the like can be considered, but the invention is not limited thereto. The energy storage device 30 may be a large-scale energy storage device that is managed by a service provider or may be a small-scale energy storage device that is managed at a general home. The storage control device 20 controls an operation of the energy storage device 30.

The control device 10 transmits information for controlling the power generation element 62 to the output control device 61. The control device 10 transmits information for controlling the energy storage device 30 to the storage control device 20. The control device 10 may be a so-called cloud server.

These devices are connected to each other via a network 50 such as the internet to transmit and receive information one another.

The power control system according to the example embodiment is configured such that charging and/or consumption of a total excess output of the plurality of power generation devices 60 distributed in a wide area is performed by the plurality of energy storage devices 30 distributed in a wide area. The total excess output (W) is an amount by which a sum of the power generation outputs (W) of the plurality of power generation devices 60 is greater than a sum of the upper limit power generation outputs (W) of a plurality of power generation devices specified with an instruction to suppress power generation. The instruction to suppress power generation is generated by, for example, an electricity transmission and distribution service provider that manages electricity transmission and distribution of a power system.

When the plurality of energy storage devices 30 can be sufficiently ensured and charging and/or consumption of the total excess output can be performed, output suppression of the power generation device 60 is not performed. The charging and/or consumption of all of the total excess output (W) is performed by the ensured energy storage devices 30. In this case, it is possible to effectively utilize the power generation devices 60 at the maximum without breakdown of a supply and demand balance of the power system.

Conversely, when the plurality of energy storage devices 30 cannot be sufficiently ensured and sufficient charging and/or consumption of the total excess output cannot be performed, the output suppression of the power generation devices 60 is performed by an amount of non-charging and/or non-consumption by the energy storage devices 30. In this case, it is t possible to efficiently utilize the power generation devices 60 within a possible range while preferentially keeping the supply and demand balance of the power system.

Figure 19:
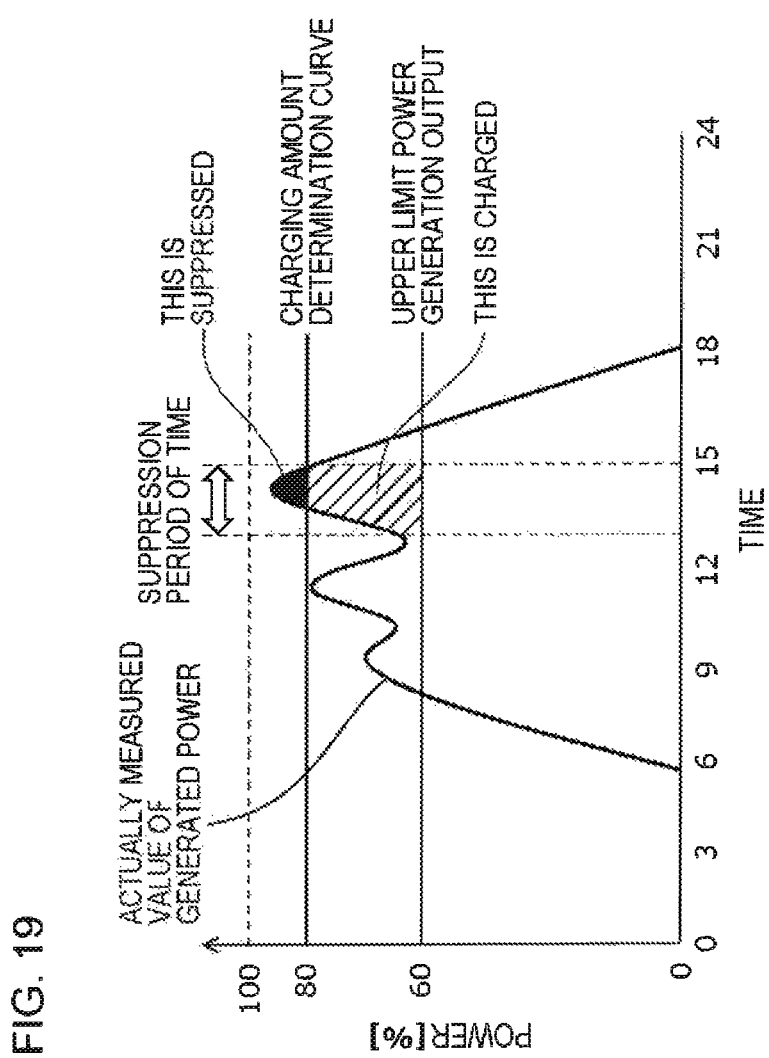
FIG. 19 is a diagram illustrating an operational effect of the power control system according to the example embodiment.

For example, as illustrated in FIG. 19, a suppression period of time and an upper power generation output (60% of a rated output of the power generation device 60) illustrated in the drawing are assumed to be determined in the instruction to suppress power generation. Then, power which can be charged and/or consumed by the energy storage devices 30 ensured for a process of absorbing the total excess output is assumed to be 20% of a rated output of the power generation devices 60. In this case, as illustrated in the drawing, a portion of the total excess output which is equivalent to up to 20% of the rated output is charged and/or consumed by the energy storage devices 30, but with respect to the remain, power generation of the power generation device 60 is suppressed. Even in this case, since the power generation device 60 can output power up to 80% of the rated output, power greater than the upper limit power generation output (60%) determined with the instruction to suppress power generation is output.

In this way, in the example embodiment, whether to suppress power generation of the power generation devices 60, content of the suppression of the power generation, and the like are determined according to the content of the instruction to suppress power generation and a situation in which the energy storage devices 30 are ensured. Each device illustrated in FIG. 2 generally operates as follows.

The control device 10 acquires an instruction to suppress power generation for each of the plurality of power generation devices 60. The instruction to suppress power generation includes a suppression period of time and an upper limit power generation output for each unit period of time. In response to the acquisition, the control device 10 determines (ensures) the energy storage devices 30 that perform a process of performing charging and/or consumption of the total excess output in the suppression period of time.

Thereafter, the control device 10 calculates a residual excess output (W) and/or a residual excess power amount (Wh) which is not chargeable or consumable in the determined energy storage devices 30 on the basis of the instruction to suppress power generation and the determined content (the situation in which the energy strange devices 30 are ensured).

When there is the residual excess output (W) and/or the residual excess power amount (Wh), the control device 10 transmits power generation control information for suppressing power generation (output) of the residual excess output and/or the residual excess power amount to the power generation device 60. When the residual excess output and the residual excess power amount are "0", the power generation suppression (output generation) is not performed.

The power generation device 60 includes a reception unit that receives information from an external device and a transmission unit that transmits information to an external device. The reception unit of the power generation device 60 receives, for example, the power generation suppression control information from the control device 10. The transmission unit of the power device 60 transmits, for example, power generation relevant information (an actually measured value (W) or the like of the output) indicating a power generation situation of the power generation device 60 itself to the control device 10.

When there are the residual excess output and the residual excess power amount, the power generation device 60 receives the power generation suppression control information from the control device 10. Indus case, the power generation device 60 performs the power generation suppression (output suppression) based on the power generation suppression control information in the suppression period of time. Conversely, when the residual excess output and the residual excess power amount is "0", the power generation device 60 generates power on the assumption that there is no power generation suppression (output suppression) even for the suppression period of time.

The control device 10 transmits control information for causing the energy storage devices 30 to perform charging and/or consumption of the total excess output to the storage control devices 20.

The storage control device 20 includes a reception unit that receives information from an external device and a transmission unit that transmits information to an external device. The reception unit of the storage control device 20 receives, for example the control information from the control device 10. The transmission unit of the storage control device 20 transmits, for example, state information (for example, a state of charge (SOC), a vacant capacity (Wh), a charging amount (Wh), a voltage, a current, temperature, a storage energy amount, or error information) indicating a state of the energy storage device 30 to the control device 10.

When the control information is received from the control device 10, the storage control device 20 causes the energy storage device 30 to perform charging and/or consumption of predetermined charging power (W) and/or consumption power (W) determined according to the control information.

Figure 3:
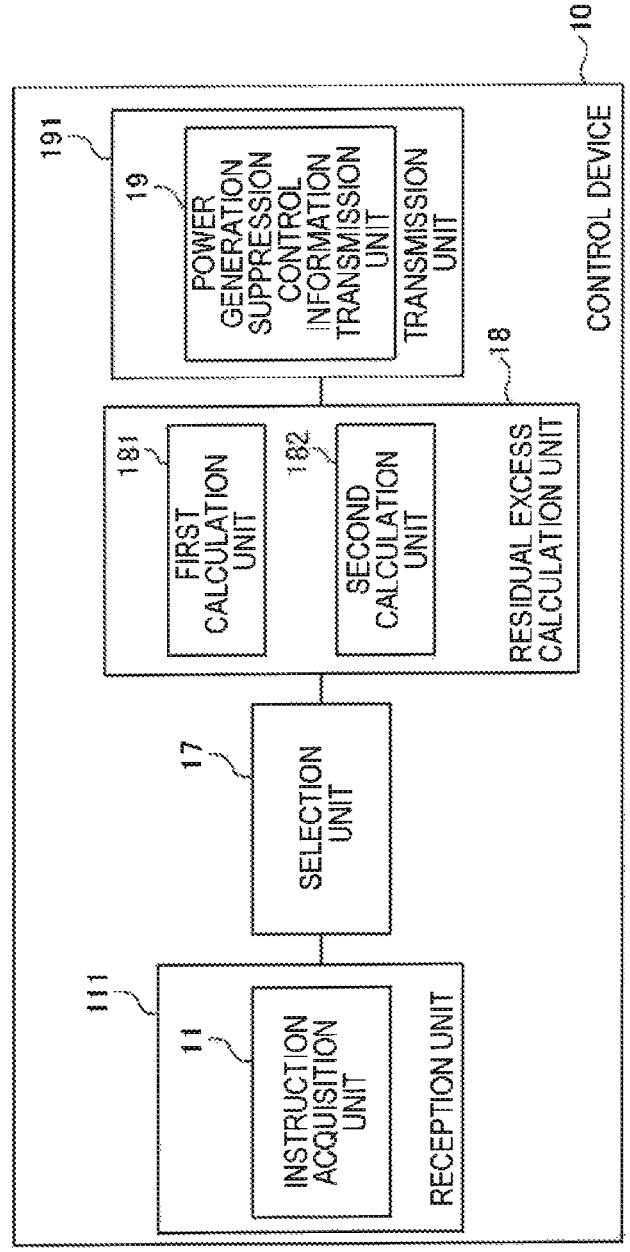
FIG. 3 is an exemplary functional block diagram illustrating a control device according to the example embodiment.

Next, a configuration of the control device 10 will be described in detail. FIG. 3 is an exemplary functional block diagram illustrating the control device 10. As illustrated in the drawing, the control device 10 includes a reception unit 111, a selection unit 17, a residual excess calculation unit 18, and a transmission unit 191. The reception unit 111 includes an instruction acquisition unit 11. The residual excess calculation, unit 18 includes a first calculation unit 181 and a second calculation unit 182. The transmission unit 191 includes a power generation suppression control information transmission unit 19.

First, the plurality of power generation devices 60 and the plurality of energy storage devices 30 to be managed are registered in the control device 10. The control device 10 causes the plurality of energy storage devices 30 to be managed to perform charging and/or consumption of the total excess output of the plurality of power generation devices 60 to be managed.

For example, attribute information regarding each of the power generation devices 60 illustrated in FIG. 4 is registered in advance in the control device 10. In FIG. 4, a power generation device identification (ID) for identifying each of the plurality of power generation devices 60, a rated output (W) of etch power generation device 60, and an installation position of each power generation device 60 are associated with each other. Some of the power generation device ID, the rated output, and the installation position may not be included and other attribute information may be further registered. The rated output (W) mentioned herein is an upper limit of a reverse power flow for each photovoltaic power generation device determined in accordance with a total number of installed photovoltaic panels or power conditioners when the power generation device 60 is, for example, a photovoltaic power generation device.

For example, attribute information (storage relevant information) of each energy storage device 30 illustrated in FIG. 5 is registered in advance in the control device 10. In FIG. 5, an energy storage device ID for identifying each of the plurality of energy storage devices 30, a type of each energy storage device 30, a rated output (W) of each energy storage device 30, a rated capacity (Wh) of each energy storage device 30, and address information of the storage control device 20 controlling each energy storage device 30 on the network 50 are associated with other. A part of the information may not be included and other attribute information may be further registered.

The type illustrated in FIG. 5 indicates, for example, classification in associated with an energy storage unit such as a secondary battery or a heat pump water heater, a type of storage cell such as a lead secondary battery or a lithium ion secondary battery, charging and discharging response characteristics of the secondary battery, and the like. When the energy storage device 30 registered as management objects are limited to one type (for example, only lithium ion second batteries), it is not necessary to register this attribute information.

Referring back to FIG. 3, the reception unit 111 receives predetermined information from an external device. The instruction acquisition unit 11 acquires an instruction to suppress power generation which is an instruction for the power generation device 60 generating power using natural energy and includes an upper limit power generation output for each suppression period of time and each unit period of time (for example, 30 minutes). The instruction acquisition unit 11 acquires the instruction to suppress power generation for the power generation device 60 to be managed.

Figure 6:
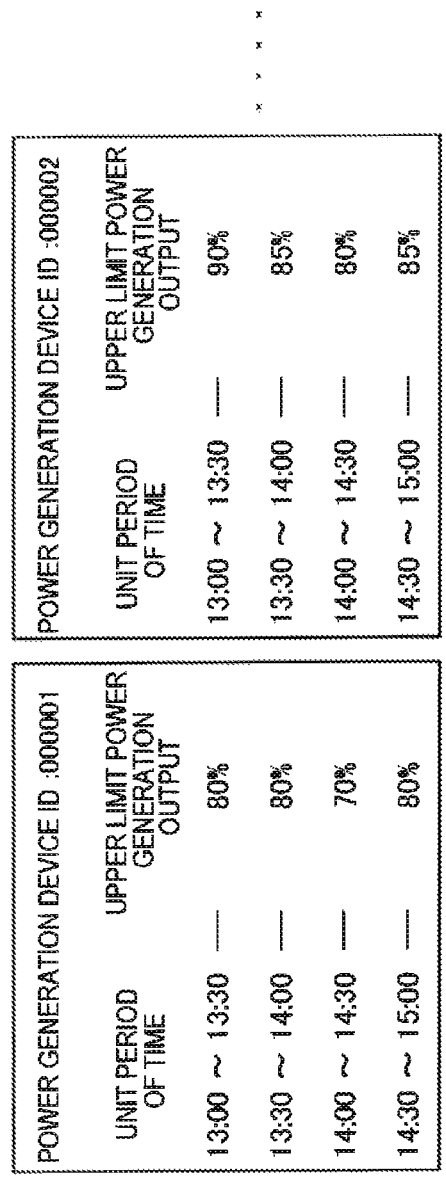
FIG. 6 is a diagram schematically illustrating an example of an instruction to suppress power generation according to the example embodiment.

The instruction to suppress power generation may have different content for each power generation device 60. FIG. 6 schematically illustrates an example of the instruction to suppress power generation. FIG. 6 illustrates the instruction to suppress power generation for each power generation device 60 (each power generation device ID).

In the instruction to suppress power generation for each power generation device 60, an upper limit power generation output for each unit period of time is indicated. In the example illustrated in the drawing, the upper limit power generation output is indicated in units of 30 minutes. In addition, the upper limit power generation output is indicated at a ratio when a rated output (W) of each power generation device 60 is 100(%). From the drawing, it can be understood that the upper limit power generation output m each unit period of time is different for each power generation device 60.

In the example illustrated in the drawing, the suppression periods of time of two power generation devices 60 are identical to each other, from 13:00 to 15:00, but the suppression period of time may be different for each power generation device 60. The power generation devices 60 receiving the instruction to suppress power generation and the power generation devices 60 not receiving the instruction to suppress power generation may coexist among the power generation devices 60 to be managed.

As another example of the instruction to suppress power generation, the content of the instruction to suppress power generation may be common to the plurality of power generation devices 60. FIG. 7 schematically illustrates an example of the instruction to suppress power generation. FIG. 7 illustrates the instruction to suppress power generation without being separated for each power generation device 40. Even in the case of this example, the power generation devices 60 receiving the instruction to suppress power generation and the power generation devices 60 not receiving the instruction to suppress power generation may coexist among the power generation devices 60 to be managed. In this case, the instruction acquisition unit 11 acquires information for identifying the power generation device 60 which is an object of the instruction to suppress power generation in addition to the instruction to suppress power generation illustrated in FIG. 7.

In the examples illustrated in FIGS. 6 and 7, the unit period of time is set to the units of 30 minutes, but the unit period of time may be set to other units such as units of 1 hour, units of 15 minutes, units of 5 minutes, and units of 1 minute. In the examples illustrated in the drawings, the upper limit power generation output is indicated at the ratio (%) of each power generation device 60 to the rated output, but the upper limit output may be indicated by the output value (for example, 400 kW).

The above-described instruction to suppress power generation is generated by, for example, a system of an electricity transmission and distribution service provider system managing electricity transmission and distribution of a power system (hereinafter also referred to as a "electricity transmission and distribution service provider system") and is transmitted to a predetermined object. Since the process by the electricity transmission and distribution service provider system can be implemented in conformity to a technology of the conventional art, the detailed description thereof will not be repeated herein. An exemplary brief outline of the process is as follows.

The electricity transmission and distribution service provider system performs power demand prediction for one following day, power generation prediction, or the like for the power generation devices 60 connected to the power system on the basis of attribute information (for example, weather forecast, a date, a day of week, and an event) of the following day. Then, necessity of power generation suppression, a period of time in which the power generation suppression is performed, a district in which the power generation suppression is performed, the power generation devices 60 as objects of the power generation suppression, a total amount of generated power to be suppressed (for each unit period of time), a suppression amount of each power generation device 60 (for each unit period of time), and the like are determined on the basis of the prediction. Then, the electricity transmission and distribution service provider system transmits the instruction to suppress power generation to a predetermined object at a predetermined timing (for example, a predetermined time of the previous day).

For example, the electricity transmission and distribution service provider system may transmit the instruction to suppress power generation for each of the plurality of power generation devices 60 registered in the control device 10, to the control device 10. In this case, the instruction acquisition unit 11 receives the instruction to suppress power generation from the electricity transmission and distribution service provider system.

In addition, the electricity transmission and distribution service provider system may transmit the instruction to suppress power generation to each of the plurality of the power generation devices 60. In this case, the instruction acquisition unit 11 receives the instruction to suppress power generation from each of the plurality of power generation devices 60 to be managed.

Referring back to FIG. 3, the selection unit 17 determines the plurality of energy storage devices 30 performing an excess absorbing process of performing charging or consumption of a total excess output during the suppression period of time. The total excess output (W) is an amount by which a sum of the actually measured values of the power generation outputs (W) of the plurality of power generation devices 60 is greater than the upper limit power generation outputs (W) of the plurality of power generation devices 60. The upper limit power generation output of each of the plurality of power generation devices 60 is deter mined on the basis of an instruction to suppress power generation. The upper limit power generation output of the power generation device 60 receiving the instruction to suppress power generation is the upper limit power generation output determined with the instruction to suppress power generation. The upper limit power generation output of the power generation device 60 not receiving the instruction to suppress power generation is, for example, a rated output.

Here, a process example in which the selection unit 17 determines the plurality of energy storage devices 30 performing the excess absorbing process will be described.

For all the energy storage devices 30 registered in advance may participate in all the excess absorbing process and may perform a process of performing charging and/or consumption of the total excess output. In this case, the selection unit 17 determines all the energy storage devices 30 registered in advance as the energy storage devices 30 that perform the excess absorbing process.

As another example, at least some of the plurality of energy storage devices 30 registered in advance may participate in the excess absorbing process and may perform the process of performing charging and/or consumption of the total excess output. In this case, the selection unit 17 determines at least some of the energy storage devices 30 participating in the excess absorbing process at each time from among the plurality of energy storage devices 30 registered in advance.

Here, the conception of "the excess absorbing process at one time" will be described. For example, the excess absorbing process (in the case of the example of FIG. 6, the excess absorbing process from 13:00 To 15:00, as illustrated in FIG. 6) in response to the instruction to suppress power generation at one time (for example the instruction to suppress power generation for the following one day) may be treated as a process of one time.

In addition, the excess absorbing process (in the case of the example of FIG. 6, the excess absorbing process from 13:00 To 15:00 in FIG. 6) in response to the instruction to suppress power generation at one time (for example, the instruction to suppress power generation for the following one day) may be divided into a plurality of excess absorbing processes and each excess absorbing process for each division may be treated as one time. For example, in the case of the example of FIG. 6, the excess absorbing process may be divided for each period of time, the excess absorbing process from 13:00 to 14:00 may be treated as one time, and the excess absorbing process from 14:00 to 15:00 may be treated as one time. A minimum unit in which a period of time is divided is not limited to 30 minutes and may be 15 minutes, 10 minutes, 1 minute, or units of tens of seconds. As the unit of division is a shorter time, the finer excess absorbing process can be performed.

In addition, the excess absorbing process in response to plural instructions to suppress power generation may be treated as a process of one time.

Here, a process example in which the selection unit 17 determines at least some of the energy storage devices 30 participating in the excess absorbing process of each time from among the plurality of energy storage devices 30 registered in advance will be described.

As one example, the plurality of energy storage devices 30 for which rotation is determined in advance may participate in the excess absorbing process in sequence along the rotation. In this case, the selection unit 17 determines at least some of the energy storage devices 30 participating in the excess absorbing process at each time on the basis of the rotation.

As another example, a user who manages each of the plurality of energy storage devices 30 may determine a condition of the excess absorbing process in which the energy storage devices 30 participate and registers the condition in the control device 10 in advance. As the condition, for example, a seasonal condition (for example, the energy storage devices 30 participate in March to August and do not participate in other seasons), a temporal condition (for example, the energy storage devices 30 participate at 9:00 to 17:00 and do not participate at the other times), an incentive condition (for example, the energy storage devices 30 participate when a compensation for excess absorbing power is 5 yens or more/kWh), and other conditions (for example, the energy storage devices 30 participate when a total time is within 2 hours, and do not participate when the total time is greater than 2 hours) are considered, but the invention is not limited thereto.

In this case, the selection unit 17 determines at least some of the energy storage devices 30 matching the participation condition from among the plurality of energy storage devices 30 registered in advance.

In addition, the selection unit 17 may recruit the users that manage in the plurality of energy storage devices 30 participating in the excess absorbing process at each time. In this case, the selection unit 17 determines the energy storage devices 30 of the users who have expressed the participation as the energy storage devices 30 participating in the excess absorbing process of each time. The recruitment is realized using a communication mechanism such as electronic mails, bulletin board systems on the network 50, or social media.

The user who manages each of the plurality of energy storage devices 30 may be able to determine a use condition of the energy storage device 30 in the excess absorbing process. The use condition is, for example, an output upper limit (W) usable in the excess absorbing process or a opacity upper limit (Wh) usable in the excess absorbing process (dial is, participation in the excess absorbing process for only part of the output or capacity of the energy storage device 30). The use condition may be determined for each excess absorbing process of each time.

Referring back to FIG. 3, the residual excess calculation unit 18 calculates the residual excess output (W) and/or the residual excess power amount (Wh) which is not chargeable or consumable in the determined energy storage devices 30 on the basis of the instruction to suppress power generation and the content determined by the selection unit 17 before the suppression period of time. Specifically, the residual excess calculation unit 18 calculates the residual excess output (W) and/or the residual excess power amount (Wh) for each unit period of time. Then, power generation suppression content of the power generation device 60 is determined for each unit period of time.

When the use condition of the energy storage device 30 in the excess absorbing process is determined, the residual excess calculation unit 18 calculates the residual excess output and/or the residual excess power amount on the basis of the use condition.

The process performed by the residual excess calculation unit 18 is realized by "the first calculation unit 181 that calculates the total excess output in the plurality of power generation devices on the basis of the power generation relevant information and the upper limit power generation output in each of the plurality of power generation devices" and "the second calculation unit 182 that calculates the residual excess power information on the basis of the total excess output and the storage relevant information in the plurality of energy storage devices 30 absorbing the total excess output". Hereinafter, an example of calculation of the residual excess output (W) and/or the residual excess power amount (Wh) and determination of the power generation suppression content will be described giving a specific example.

Example 1

First, a process of calculating the residual excess output (W) and/or the residual excess power amount (Wh) for each unit period of time will be described. For example, the instruction acquisition unit 11 is assumed to acquire the instruction to suppress power generation, as illustrated in FIG. 7, with regard to 10 power generation devices 60 (a rated output of 500 kW) and 5 power generation devices 60 (a rated output of 400 kW).

In this case, as illustrated in FIG. 8, an upper limit of the total excess output (W) and an upper limit of the total excess output amount (Wh) in each unit period of time are calculated. A unit period of time from 13:00 to 13:30 will be described as an example. From FIG. 7, the upper power generation output in the unit period of time is 80% of the rated output. Therefore, the upper limit of the excess output in the unit period of time is 20% of the rated output. The upper limit of the total excess output is a value obtained by adding up 20% of the rated outputs of the 15 power generation devices 60 receiving the instruction to suppress power generation, as illustrated in FIG. 7. Then, the total excess output amount is a value obtained by multiplying the upper limit of the total excess output by 0.5 hours of the unit period of time.

From the results of FIG. 8, it can be understood that the upper limit of the total excess output which is the largest in the whole suppression period of time is 2100 kW of the unit period of time from 14:00 to 14:30, and the upper limit of the total excess output amount of the whole suppression period of time is 3150 kWh.

Subsequently, as illustrated in FIG. 9, the selection unit 17 is assumed to determine (ensure) 200 energy storage devices 30 which can use an output of 5 kW and a capacity of 6 kWh in the excess absorbing process and 100 energy storage devices 30 that can use an output of 4 kW and a capacity of 5 kWh in the excess absorbing process.

In this case, as illustrated in FIG. 9, a total output of the determined 300 energy storage devices 30 is 1400 kW (=5 kW×200+4 kW×100) and a total capacity is 1700 kWh (=6 kWh×200+5 kWh×100).

In the case of this ensuring situation, an output equivalent to 700 kW (=2100 kW−1400 kW) is lacking only in the unit period of time form 14:00 to 14:30 with respect to the upper limit of the total excess output and a capacity equivalent to 1450 kWh (=3150 kWh−1700 kWh) is lacking with respect to the upper limit of the total excess output. In this case, the residual excess calculation unit 18 allocates the usable capacity to each unit period of time, for example, as illustrated in FIG. 9.

The allocation rule is a design factor. For example, the usable capacity may be allocated equally to the plurality of unit periods of time or a method in which an operator of the control device 10 allocates the usable capacity at each time may be determined. Here, since a generated power amount may not be planned in the case of renewable energy power generation, it is preferable to refer to a predicted value of the power generation in advance or use a scheme of reducing a power generation suppression amount stochastically during the whole suppression period of time.

As an example of the allocation process, the usable capacity may also be allocated individually to each power generation device on the basis of a predicted value of the power generation and an upper limit power generation output of each power generation device 60. Specifically, when the predicted value of the power generation differs for each power generation device 60, magnitude of the power generation suppression control information may be determined on the basis of an amount by which the predicted value of the power generation of each power generation device 60 is greater than the upper limit power generation output. That is, a larger burden of the power generation suppression (an amount of suppression of the power generation is large) may be allocated to the power generation device 60 having a relatively large amount by which the predicted value of the power generation is greater than the upper limit power generation output. Conversely, a smaller burden of the power generation suppression (an amount of suppression of the power generation is small) may be allocated to the power generation device 60 having a relatively small amount by which the predicted value of the power generation is greater then the upper limit power generation output. The power generation device 60 in which the predicted value of the power generation is relatively smaller than the upper limit power generation output may not receive the power generation suppression control information or may not suppress the power generation even when the power generation suppression control information is received.

In addition, the control device 10 may calculate an excess output, by which a power generation output is greater than the upper limit power generation output, using the predicted value of the power generation of each power generation device 60 and may calculate a ratio of the excess output to the total excess output of the plurality of power generation devices 60 of which the power generation output is equal to or greater than the upper limit power generation output, for each power generation device 60. Then, the control device 10 may perform allocation to each power generation device 60 on the basis of a sharing coefficient (ratio) of each power generation device 60 and the power generation suppression control information. Then, the control device 10 may transmit power generation suppression information indicating content allocated individually to each power generation device 60. That is, the control device 10 may calculate a share of the power generation suppression of the power generation device 60 on the basis of the magnitude of the sharing coefficient (ratio) in the power generation suppression control information and may transmit the power generation suppression information individually allocated to each power generation device 60.

It is necessary to set the power amount allocated to each unit period of time to be equal to or less than a product of "the total output of the plurality of energy storage devices 30" and "a time of each unit period of time". In the case of the ensuring situation illustrated in FIG. 9, it is necessary to set the power amount allocated to each unit period of time to be equal to or less than 700 kWh which is a product of 1400 kW (see FIG. 9) and 0.5 hours. In this way, it is possible to avoid generation of the residual excess output (W) in each period of time. In the case of the allocation example in FIG. 9, the power amount is allocated so that the condition is satisfied.

In FIG. 9, as a result obtained by using the prediction of photovoltaic power generation, it is predicted that a generated power amount from 13:00 to 14:00 is relatively large, but a generated power amount from 14:00 to 15:00 is relatively small (there is also the power source which does not reach the upper limit power generation output by the instruction to suppress power generation). Therefore, in consideration of the situation of the upper limit power generation output by the instruction to suppress power generation, 500 kWh (a necessary output of 1000 kW) is allocated to a period from 13:00 to 13:30, a period from 13:30 to 14:00, and a period from 14:00 to 14:30 and 200 kWh (a necessary output of 400 kW) is allocated to a period from 14:30 to 15:00.

This means that charging and/or consumption of the total excess output is performed by the plurality of energy storage devices 30 at the upper limit of an output of total 1000 kW and the upper limit of a capacity of total 500 kWh in the unit periods of time from 13:00 to 13:30, from 13:30 to 14:00, and 14:00 to 14:30, and charging and/or consumption of the total excess output is performed by the plurality of energy storage devices 30 at the upper limit of an output of total 400 kW and the upper limit of a capacity of total 200 kWh in the unit period of time from 14:30 to 15:00.

After the above-described allocation (see FIG. 9), the residual excess calculation unit 18 calculates a difference between the capacity (charged/consumed power amount (upper limit)) allocated to each unit period of time and the upper limit of the total excess output amount (see FIG. 8) in each unit period of time as a residual excess power amount in each unit period of time.

Next, a process in which the residual excess calculation unit 18 determines the power generation suppression content of the power generation device 60 for each unit period of time will be described. The residual excess calculation unit 18 increases a value of the power generation suppression (output suppression) (increases the value of the power generation suppression information) as the residual excess power and/residual excess power amount (a value of the residual excess power information) is larger.

As illustrated in FIG. 9, after the residual excess power amount is calculated for each unit period of time, the residual excess calculation unit 18 allocates the power generation suppression (output suppression) equivalent to the residual excess power amount to the plurality of power generation devices 60. The allocation rule is a design factor but the power generation suppression may be allocated equally to the plurality of power generation devices 60. For example, the power generation suppression (output suppression) equivalent to the residual excess power amount may be proportionally divided to the plurality of power generation devices 60. In addition, a suppression ratio to the rated output may be equalized in the plurality of power generation devices 60.

FIG. 9 illustrates an example in which the suppression ratio to the rated output is equalized in the plurality of power generation devices 60. A value of the "output upper limit" in each unit period of time illustrated in FIG. 9 indicates content of the power generation suppression (output suppression). This indicate the suppression ratio (output upper limit) to the rated output and is applied commonly to all the power generation devices 60.

It is assumed that M (where M is a percentage value and is in $0 \leq M \leq 1$) as an output upper limit is set in 10 power generation devices 60 (see FIG. 8) with a rated output of 500 kW and M as an output upper limit is similarly set in 5 power generation devices 60 with a rated output of 400 kW. In this case, a maximum of the power amount suppressed in the unit period is 500 kW (1−M)×10 devices×0.5 hours+400 kW× (1−M)×5 devices×0.5 hours. M may be calculated so that this value is the residual excess power amount in each unit period of time.

For example, since 400 kW is lacking from 13:00 to 13:30, the power generation upper limit is a rated value of 7000 kW-400 kW=6600 kW of all the 15 power generation devices 60 and the suppression ratio is 6600 kW/7000 kW=33/35. That is, M=33/35. Similarly, since 1100 kW is lacking form 14:00 to 14:30, the power generation upper limit is rated value of 7000 kW-1100 kW=5900 kW/7000 kW of all the 15 power generation devices 60 and the suppression ratio is 5900 kW/7000 kW=59/70. That is, M=59/70.

Example 2

In Example 1, an example in which the residual excess power amount (Wh) is generated and the power generation suppression (output suppression) equivalent to the residual excess power amount is performed had been mainly described. In Example 2, an example in which the residual excess output (W) is generated and the power generation suppression (output suppression) is performed will be described. Like Example 1, the instruction acquisition unit 11 is assumed to acquire the instruction to suppress power generation, as illustrated in FIG. 7, with regard to 10 power generation devices 60 (a rated output of 500 kW) and power generation devices 60 (a rated output of 400 kW).

In this case, as illustrated in FIG. 8, an upper limit of the total excess output (W) and an upper limit of the total excess output amount (Wh) in each unit period of time are calculated.

Then, as illustrated in FIG. 10, the selection unit 17 is assumed to determine (ensure) 200 energy storage devices 30 which can use an output of 5 kW and a capacity of 20 kWh in the excess absorbing process and 100 energy storage devices 30 that can use an output for 4 kW and a capacity 20 kWh in the excess absorbing process.

In this case, as illustrated in FIG. 10, a total output of the plurality of determined energy storage device 30 is 1400 kW (=5 kW×200+4 kW×100) and a total capacity is 600 kWh (=20 kWh×200+20 kWh×100).

Here, a sum (3150 kWh) of the total excess output amounts in the plurality of unit periods of time illustrated in FIG. 8 is equal to or less than the total capacity (6000 kWh) of the energy storage device 30 illustrated in FIG. 10. That is sufficient capacity is ensured to perform charging and/or consumption of the upper limit of the total excess output amount.

On the other hand, when the upper limit of the total excess output in each unit period of time illustrated in FIG. 8 is compared to the total output (1400 kW) of the energy storage devices 30 illustrated in FIG. 10, the upper limit (2100 kW) of the total excess output in the unit period of time from 14:00 to 14:30 is greater than the total output (1400 kW) of the energy storage devices 30. Therefore, the residual excess calculation unit 18 calculates the residual excess output of 700 kW (=2100 kW-1400 kW) in the unit period of time from 14:00 to 14:30.

The upper limit (1400 kW) of the total excess output in the other unit periods of time illustrated in FIG. 8 is equal to or less than the total output (1400 kW) of the energy storage devices 30 illustrated in FIG. 10. Therefore, the residual excess calculation unit 18 calculates 0 kW as the residual excess output in the other unit periods of time.

In the case of this example, the residual excess calculation unit 18 determines suppression content in which the power generation suppression (output suppression) equivalent to the residual excess output is performed in the unit period of time from 14:00 to 14:30. A rule in which the power generation suppression (output suppression) equivalent to the residual excess output is allocated to the plurality of power generation devices 60 is a design factor. Herein, the suppression ratio to the rated output is assumed to be equalized in the plurality of power generation devices 60.

It is assumed that M (where M is a percentage value and is in 0≤M≤1) as an output upper limit is set in 10 power generation devices 60 (see FIG. 8) with a rated output of 500 kW and M as an output upper limit is similarly set in 5 power generation devices 60 with a rated output of 400 kW. In this case, the output power to be suppressed is 500 kW (1-M)×10 devices+400 kW×(1−M)×5 devices. M may be calculated so that this value is the residual excess output in each unit period of time.

As a common assumption to Examples 1 and 2, the suppression ratio equivalent to the residual excess output/ residual excess power amount may not be matched in the plurality of power generation devices 60 and may differ for each power generation device 60 in consideration of a situation or the like of the power generation prediction of each power generation device. Even in this case, under the same idea, the output upper limit (for example, the suppression ratio or the like to the rated output) of each power generation device 60 can be calculated.

Referring back to FIG. 3, the transmission unit 191 transmits predetermined information to an external device. The power generation suppression control information transmission unit 19 transmits the power generation suppression control information for suppressing power generation equivalent to the residual excess output and/or the residual excess power amount to each of the plurality of power generation devices 60. The power generation suppression control information may include the upper limit power generation output in each unit period of time of the suppression period of time. The power generation suppression control information transmission unit 19 can transmit the power generation suppression information before the suppression period of time.

For example, the power generation suppression control information transmission unit 19 transmits the output upper limit (for example, the suppression ratio to the rated output: see the output upper limit in FIGS. 9 and 10) in each unit period of time calculated by the residual excess calculation unit 18 to the plurality of power generation device 60.

The transmission unit 191 can transmit control information for canning the energy storage devices 30 to perform the charging and/or consumption of the total excess output, to the storage control devices 20.

Figure 11:
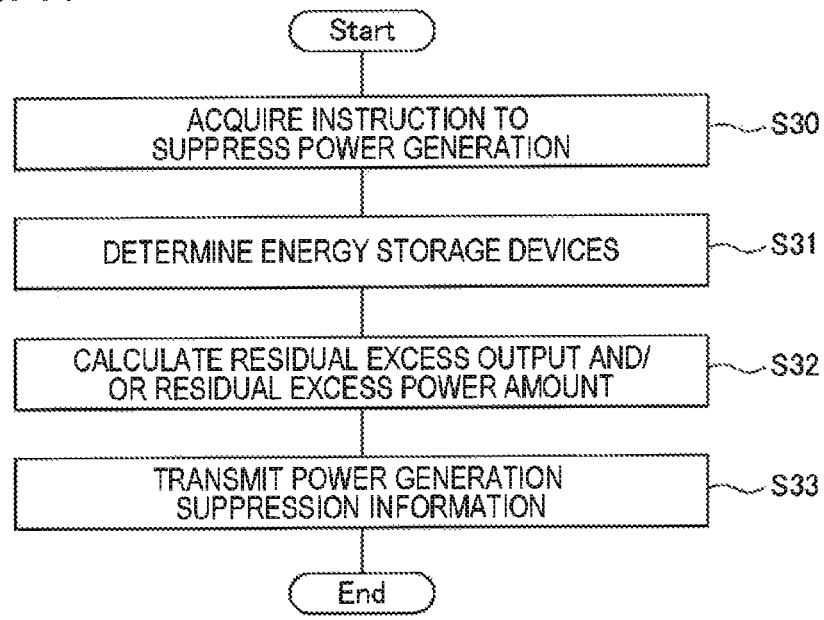
FIG. 11 is a flowchart illustrating an example of a flow of a process of the control device according to the example embodiment.

Next, an example of a flow of a process of the control device 10 according to the example embodiment will be described wife reference to the flowchart of FIG. 11.

Fist, the instruction acquisition unit 11 acquires the instruction to suppress power generation, which is an instruction for the power generation device 60 generating power using natural energy and includes the suppression period of time and the upper limit power generation output in each unit period of time (S30).

Subsequently, the selection unit 17 determines (ensures) the plurality of energy storage devices 30 performing the excess absorbing process of performing charging and/or consumption of the total excess output in the suppression period of time (S31).

Subsequently, the residual excess calculation unit 18 calculates the residual excess output (W) and/or the residual excess power amount (Wh) which is not chargeable and/or consumable in the determined energy storage devices 30 on the basis of the instruction to suppress power generation acquired in S30 and the content determined by the selection unit 17 in S31 (S32).

Subsequently, the power generation suppression control information transmission unit 19 transmits the power generation suppression control information for suppressing power generation equivalent to the residual excess output and/or the residual excess power amount to each of the plurality of power generation devices 60 (S33). When the residual excess output and the residual excess power amount is calculated to "0" in S32, the process of S33 may not be performed to end or power generation suppression information indicating the content may be transmitted.

The processes of S30 to S33 are performed before the suppression period of time specified with the instruction to suppress power generation.

The power generation device 60 receiving the power generation suppression control information transmitted in S33 performs the power generation suppression (output suppression) on the basis of the power generation suppression control information in the suppression period of time specified with the instruction to suppress power generation.

Specifically, the power generation control unit of the power generation device 60 controls the power conditioner on the basis of the power generation suppression control information received from the power generation suppression control information transmission unit 19 and suppresses power supplied from the power generation element to the power system to a predetermined value or less specified with the power generation suppression control information.

Figure 2:
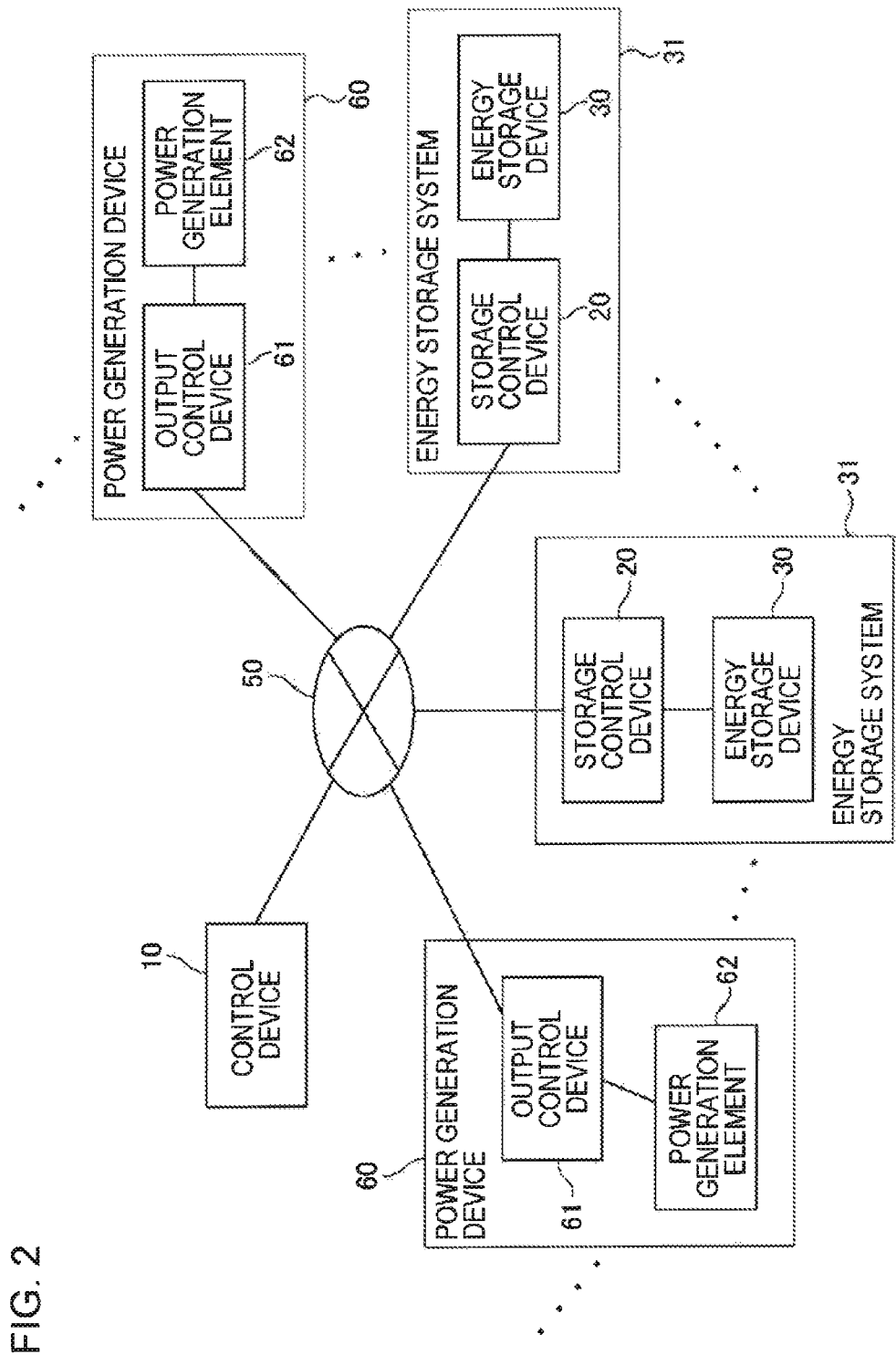
FIG. 2 is a diagram illustrating an example of an overview and a brief outline of a power control system according to the example embodiment.

In the suppression period of time, the storage control device 20 in FIG. 2 controls the energy storage device 30 according to the control information received from the control device 10 such that the energy storage device 30 perform charging and/or consumption of predetermined charging power and/or consumption power. In the example embodiment, the details of the process are a design factor and can be adopted in all the configurations. An example will be described in the following example embodiment.

As described above, the power control system according to the example embodiment relates to a technology for performing charging and/or consumption of the total excess output of the plurality of power generation devices 60 distributed in a wide area in the plurality of energy storage devices 30 distributed in a wide area.

When the plurality of energy storage device 30 can be sufficiently ensured and sufficient charging and/or consumption of the total excess output can be performed, only the energy storage devices 30 perform absorption (charging and/or consumption) of the total excess output without performing the power generation suppression (output suppression) of the power generation devices 60. In this case, it is possible to effectively utilize the power generation devices 60 at the maximum without breakdown of a supply and demand balance of the power system.

Conversely, when the plurality of energy storage devices 30 may not sufficiently be ensured sufficient charging and/or consumption of the total excess output may not be performed (is assumed or predicted), the power generation suppression (output suppression) of the power generation devices 60 is performed by power which is not chargeable and/or consumable. That is, the energy storage devices 30 and the power generation devices 60 perform absorption (charging and/or consumption and power generation suppression (output suppression)) of the total excess output. The absorption (charging and/or consumption) of the total excess output performed by the energy storage devices 30 is utilized as much as possible, and only a shortfall is made up through the absorption (the power generation suppression (output suppression)) by the power generation devices 60.

As described above, according to the example embodiment, it is possible to effectively utilize the power generation devices 60 while preferentially keeping the supply and demand balance of the power system.

Second Example Embodiment

The control device 10 according to the example embodiment can detect occurrence of an event changing content of the power generation suppression control information in the suppression period of time. Then, the control device 10 transmits new power generation suppression control information to the plurality of power generation devices 60 according to the detection of the event. As a result, it possible to use the capacity of the determined (ensured) energy storage devices 30 without waste. Additionally, it is possible to appropriately keep a supply and demand balance of the power system. Hereinafter, detailed description will be made.

The configurations of the strange control device 20 and the energy storage device 30 of the power control system according to the example embodiment are the same as those of the first example embodiment. Hereinafter, the configurations of the control device 10 and the power generation device 60 will be described.

Figure 12:
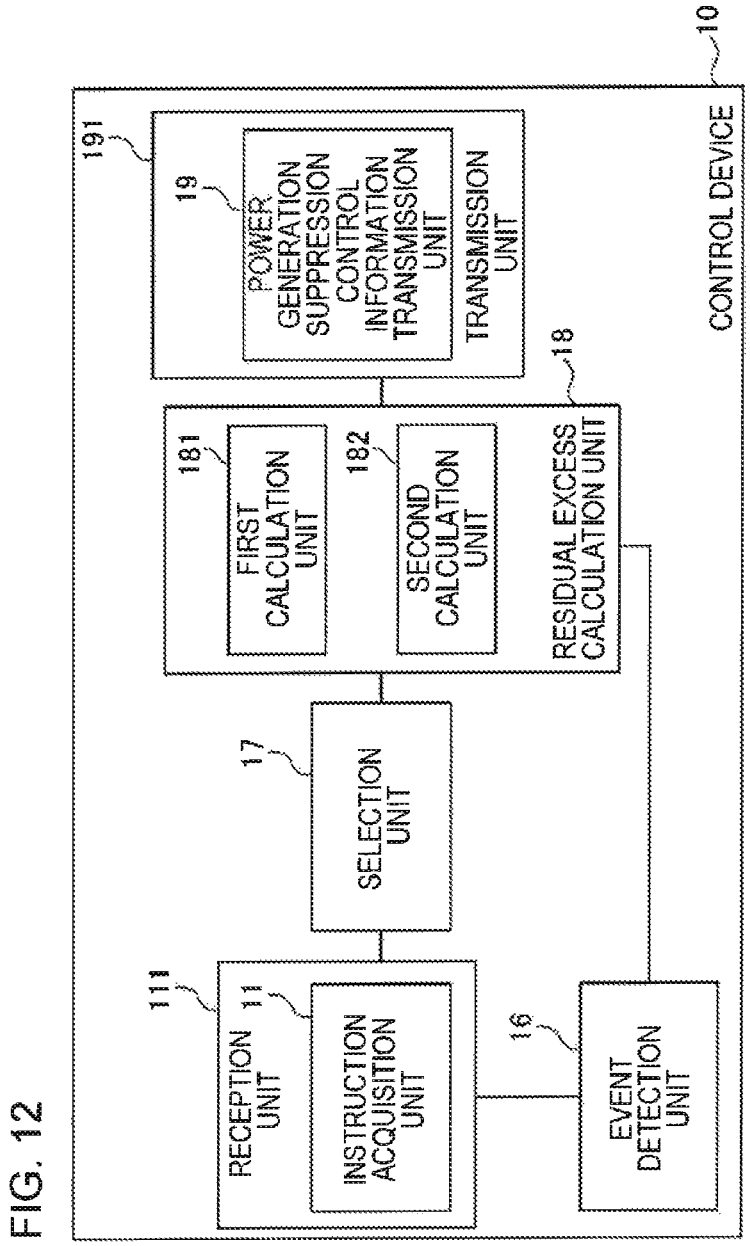
FIG. 12 is an exemplary functional block diagram illustrating the control device according to the example embodiment.

FIG. 12 is an exemplary functional block diagram illustrating the control device 10 according to the example embodiment. As illustrated in the drawing, the control device 10 includes a reception unit 111, a selection unit 17, a residual excess calculation unit 18, a transmission unit 191, and an event detection unit 16. The configurations of the reception unit 111 and the selection unit 17 are the same as those of the first example embodiment.

The event detection unit 16 detects occurrence of an event changing content of the power generation suppression control information in the suppression period of tune.

For example, as illustrated in FIG. 9, when the residual excess power amount occurs, the event detection unit 16 detects an event (a first event) in which a result of the total excess output amount in a first unit period of time is less than "the power amount of the charging and/or consumption ("the power amount (the upper limit) of the charging and/or consumption" in FIG. 9) in the plurality of energy storage devices 30" allocated to the fast unit period of time by the residual excess calculation unit 18.

A specific example will be described. In the case of the example illustrated in FIG. 9, the residual excess power amount occurs in each unit period of time and "a power amount of charging and/or consumption by the plurality of energy storage devices 30" determined to correspond to the unit period of time from 13:00 to 13:30 is 500 kWh. In this situation, when a result of the total excess output amount in the unit period of time from 13:00 to 13:30 is less than 500 kWh, the event detection unit 16 detects the feet that the result of the total excess output amount is less than 500 kWh, as an event changing the content of the power generation suppression control information.

The event unit 16 maintains information indicating "the power amount (the power amount (upper limit) of "the charging and/or consumption" in FIG. 9) of the charging and/or consumption by the plurality of energy storage devices 30 in advance in each of the plurality of unit periods" determined by the residual excess calculation unit 18. Then, the event detection unit 16 detects the first event by calculating the result of the total excess output based on the actually measured value of each of the plurality of power generation devices 60 for each unit period of time and comparing the result to the maintained information. Alternatively, the event detection unit 16 detects the first event by calculating the result of the total excess output amount on the basis of the actually measured value of the power amount stored by each of the plurality of energy storage devices 30 for each unit period of time and comparing the result to the maintained information.

Another example of the event detected by the event detection unit 16 will be described. The event detection unit 16 may monitor a state of a communication path reaching from the control device 10 to the storage control device 20, a state of the energy storage device 30 (a full charging state or a depletion state of a secondary battery, a value of SOC, or the like), or the like and may detect an event (a second event) indicating that some of the plurality of energy storage devices 30 determined by the selection unit 17 may not perform the excess absorbing process due to a communication failure, considerable delay of communication, or runout of a charging ability due to an influence of an abnormal increase in temperature of the energy storage devices 30, overcurrent occurrence, occurrence of voltage abnormality, or the energy storage device 30 used for another purpose in the suppression period of time. An additional cause for not performing the excess absorbing process is considered to be, for example, breakdown or the like of the energy storage device 30, but the invention is not limited thereto.

The detection unit 16 may acquire, for example, a signal indicating that the second event occurs form a monitoring device that monitors an operation of the energy storage device 30 while the excess absorbing process is being performed. An operator of the control device 10 may input the signal to the control device 10. Then, event detection unit 16 may detect the second event by acquiring the signal. For example, each storage control device 20 may include the monitoring device.

The residual excess calculation unit 18 recalculates the residual excess output and/or tire residual excess power amount according to the detection of the event by the event detection unit 16. Then, the residual excess calculation unit 18 recalculates the power generation suppression content for each of the plurality of power generation devices 60 on the basis of the result.

For example, when the event detection unit 16 detects the first event, the residual excess calculation unit 18 calculates a value (hereinafter referred to as an "unused capacity")

obtained by subtracting, from the power amount ("the power amount (upper limit) of the charging and/or consumption" in FIG. 9) determined for the charging and/or consumption by the plurality of energy storage devices 30 in the unit period of time in which the first event occurs (hereinafter referred to as the "first unit period of time"), the result of the total excess output amount in the first unit period of time.

Then, the residual excess calculation unit 18 allocates the unused capacity to a unit period of time later than the first unit period of time. For example, the unused capacity may be allocated to a unit period of time in which the total excess power amount is large. Alternatively, the unused capacity may be allocated to a unit period of time in which the residual excess power amount is large. Thus, the power amount ("the charged and/or consumed power amount (upper limit) in FIG. 9) determined for charging and/or consumption by the plurality of energy storage devices 30 in a predetermined unit period of time increases by the allocated amount. In this way, the residual excess calculation unit 18 determines the charged and/or consumed power amount of the plurality of energy storage devices 30 for each unit period of time again. The rule for allocating the unused capacity is a design factor. Then, the residual excess calculation unit 18 determines the power generation suppression content of the plurality of power generation devices 60 according to the newly calculated residual excess power amount in each unit period of time. A method of determining the power generation suppression content of the plurality of power generation devices 60 according to the residual excess power amount has been described above.

Herein, a specific example will be described. For example, the residual excess calculation unit 18 is assumed to determine a power amount of the charging and/or consumption by the plurality of energy storage devices 30 in each of the plurality of unit periods of time, as illustrated in FIG. 9 before the suppression period of time. That is, 500 kWh is determined in the unit periods of time from 13:00 to 13:30, from 13:30 to 14:00, and 14:00 to 14:30 and 200 kWh is determined in the unit period of time from 14:30 to 15:00.

Then, as illustrated in FIG. 13, a result of the total excess output amount in the unit period of time from 13:00 to 13:30 is assumed to be 200 kWh. In this case, the residual excess calculation unit 18 calculates 300 kWh (=500 kWh-200 kWh) as the unused capacity. Then, the residual excess calculation unit 18 allocates the capacity of 300 kWh to a subsequent unit period of time.

In the case of the example in FIG. 13, the residual excess calculation unit 18 allocates the power of 300 kWh to the unit period of time from 14:30 to 15:00. As a result, the power amount determined for charging and/or consumption by the plurality of energy storage devices 30 in the unit period of time is 500 kWh and the residual excess power amount is 200 kWh.

When the event detection unit 16 detects the second event, the residual excess calculation unit 18 ascertains the plurality of energy storage devices 30 capable of performing the excess absorbing process and calculates the residual excess output and/or the residual excess power amount or determines the power generation suppression content of the plurality of power generation devices 60 on the basis of the energy storage device 30. This process can be realized as in the process of the residual excess calculation unit 18 described in the first example embodiment.

Referring back to FIG. 12, the power generation suppression control information transmission unit 19 transmits the newly determined power generation suppression control information to each of the plurality of power generation devices 60 in response to the residual excess calculation unit 18 recalculating the residual excess output and/or the residual excess power amount.

According to the above-described example embodiment, it is possible to realize the same operational effects as those of the first example embodiment.

When an actual total excess output amount docs not reach the power amount determined in advance for the charging and/or consumption by the plurality of energy storage devices 30 in a predetermined unit period of time, the unused capacity occurs in the plurality of energy storage devices 30. When the total capacity of the plurality of determined (ensured) energy storage devices 30 runs short and the residual excess power amount occurs, the unused capacity can be effectively utilized so that the power generation devices 60 can be more effectively utilized. Since the first event is detected, it is possible to reduce a power generation suppression amount.

According to the example embodiment, it is possible to detect occurrence of such a situation and reexamine the power generation suppression content for the plurality of power generation devices 60 according to the detection content. As a result, it is possible to more effectively utilize the power generation devices 60.

According to the example embodiment, when a fault occurs in some of the plurality of determined (ensured) energy storage devices 30 and the excess absorbing process may not be performed, the fault can be detected and the power generation suppression content for the plurality of power generation devices 60 can be reexamined according to the detected content. In this case, for example, it is possible to change the power generation suppression content so that the power generation suppression amount of each of the plurality of power generation devices 60 increases. As a result, it is possible to reduce a trouble of excess of power supply to the power system. Since the second event is detected, it is possible to change the power generation suppression content so that the power generation suppression amount increases.

In this way, according to the example embodiment, by detecting a predetermined event and reexamining the power generation suppression content for the plurality of power generation devices 60 according to the event, it is possible to effectively utilize the determined (ensured) energy storage devices 30, effectively utilize the power generation devices 60, keep the supply and demand balance of the power system.

Third Example Embodiments

In the example embodiment, configuration examples of the storage control device 20 and the energy storage device 30 will be described. Specifically, a specific example of a process of performing charging and/or consumption of the total excess output of the plurality of power generation devices 60 will be described. According to the example embodiment, it is possible to reduce a time lag between a timing at which excess output flows reversely from the power generation devices 60 to the power system and a timing at which the energy storage devices 30 performs charging and/or consumption of the excess power.

Figure 14:
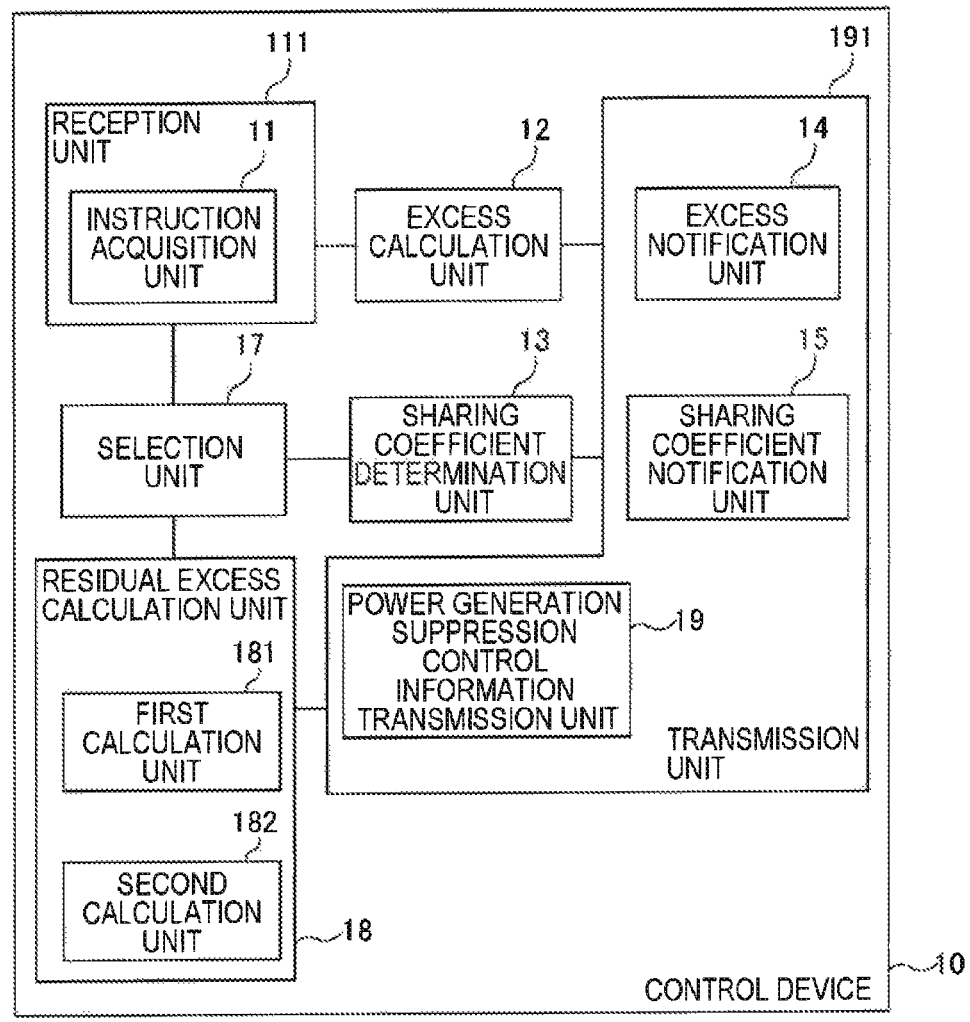
FIG. 14 is an exemplary functional block diagram illustrating the control device according to the example embodiment.

The configuration of the power generation device 60 is the same as that of the first and second example embodiments. Hereinafter, the configurations of the control device 10 and the storage control device 20 will be described. FIG. 14 is an exemplary functional block diagram illustrating the control device 10. As illustrated in the drawing, the control device 10 includes the reception unit 111, an excess calculation unit 12, a sharing coefficient determination unit 13, the selection unit 17, a residual excess calculation unit 18, and a transmission unit 191. The control device 10 may further include the event detection unit 16. The reception unit 111 includes an instruction acquisition unit 11. The transmission unit 191 includes an excess notification unit 14, a sharing coefficient notification unit 15, and a power generation suppression control information transmission unit 19. The residual excess calculation rant 18 includes the first calculation unit 181 and the second calculation unit 182. The excess notification unit 14, the sharing coefficient notification unit 15, and the power generation suppression control information transmission unit 19 can perform communication via the same communication unit.

The configurations of the reception unit 111, the event detection unit 16, the selection unit 17, the residual excess calculation unit 18, and the power generation suppression control information transmission unit 19 are the same as those of the first and second example embodiments.

The sharing coefficient determination unit 13 determines the sharing coefficient indicating a sharing ratio of the excess absorbing process for each of the plurality of energy storage devices 30 determined as the devices performing the excess absorbing process by the selection unit 17. The sharing coefficient determination unit 13 determines the sharing coefficient before the excess absorbing process starts. The sharing coefficient determination unit 13 determines the sharing coefficient, for example, in the following method.

As described in the first example embodiment, the user managing each of the plurality of energy storage devices 30 may determine the use condition of the energy storage device 30 in the excess absorbing process. The use condition is, for example, an output upper limit (W) usable in the excess absorbing process or a capacity upper limit (Wh) usable in the excess absorbing process.

For example, the sharing coefficient determination unit 13 determines the sharing coefficient on the basis of the use condition or the design (see FIG. 5) of each energy storage device 30. For example, a sharing coefficient which is a heavier sharing ratio, that is, the larger sharing coefficient, is determined for the energy storage device 30 that has a larger usable output upper limit or a larger usable capacity upper limit. A specific calculation method is a design factor.

The sharing coefficient indicates a sharing ratio of each energy storage device 30 to the total excess output. The sharing coefficient may be expressed by percentage. In the case of this example, for example, the energy storage device 30 for which, for example, a sharing coefficient of "0.05" is determined performs charging and/or consumption of an output which is 5% of the total excess output during the excess absorbing process.

In addition the sharing coefficient may be a value obtained by normalizing a percentage value. For example, n value obtained by multiplying the percentage value by a predetermined value N (a value equal to or larger than the upper limit of the total excess power (W)) may be the sharing coefficient.

The sharing coefficient determination unit 13 can determine the sharing coefficient for unit time of the suppression period of time.

Referring back to FIG. 14, the sharing coefficient notification unit 15 transmits the sharing coefficient of each of the energy storage devices 30 determined by the sharing coefficient determination unit 13 to each of the plurality of storage control devices 20 controlling an operation of each of the energy storage devices 30. The sharing coefficient may be transmitted in association with information for identifying the excess absorbing process in which the sharing coefficient is effective. For example, the sharing coefficient may be transmitted in association with an effective period or a time, like "13:00 to 15:00, Dec. 4, 2015".

A transmission timing of the sharing coefficient is any timing after the sharing coefficient is determined by the sharing coefficient determination unit 13 and before the excess absorbing process is started.

The sharing coefficient notification unit 15 sequentially transmits the sharing coefficient with content corresponding to each energy storage device 30, to each of the plurality of storage control devices 20.

The excess calculation 12 repeatedly calculates the total excess output on the basis of an actually measured value of power generation of each of the plurality of power generation devices 60 in the suppression period of time. The total excess output (W) is an amount by which "a sum of actually measured values of power generation outputs (W) of the plurality of power generation devices 60" is larger than "a sum of upper limit power generation outputs (W) of the plurality of power generation devices 60".

Figure 20:
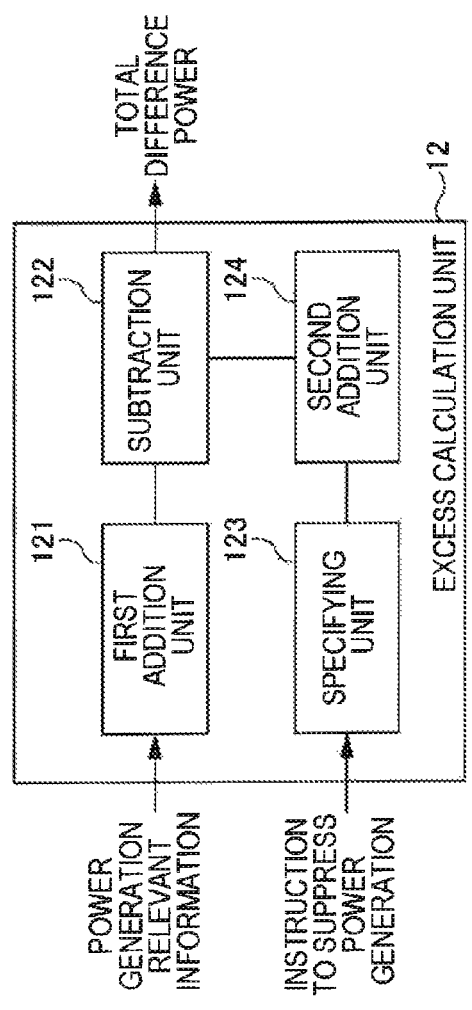
FIG. 20 is an exemplary functional block diagram illustrating an excess calculation unit according to the example embodiment.

FIG. 20 is an exemplary fractional block diagram illustrating the excess calculation unit 12. As illustrated in the drawing, the excess calculation unit 12 includes a first addition unit 121, a subtraction unit 122, a specifying unit 123, and a second addition unit 124.

First, the reception unit 111 (see FIG. 3) receives power generation relevant information (power generation output actually measured value) regarding each power generation situation from each of the plurality of power generation devices 60 for each predetermined period T1$a$.

For example, each of the plurality of power generation devices 60 repeatedly acquires data of a power generation output (instantaneous value (W)) of each power generation device 60 measured at a predetermined time interval (for example, 400 msec) through real-time processing in the suppression period of time. Then, each of the plurality of power generation devices 60 repeatedly transmits the measured value to the control device 10 at a period T1$a$ (for example, 10 sec) longer than the time interval above. For example, the power generation device 60 transmits a representative value (for example, an average value, a maximum value, a minimum value, a mode, or a median value) of the plurality of measured values obtained during the period T1$a$ to the control device 10.

Each of the plurality of power generation devices 60 transmits the measured values to the control device 10 by shifting a timing by a time less than the period T1$a$ so that data to be mutually transmitted is not congested.

The first addition unit 121 acquires the power generation relevant information received by the reception unit 111. Then, the first addition unit 121 calculates a sum of the power generation outputs (tire actually measured values) of the plurality of power generation devices 60. The first addition unit 121 repeatedly calculates "the sum of the power generation outputs (the actually measured values of the power generation power) of the plurality of power generation devices 60", for example, at the same period as the period T1$a$.

The specifying unit 123 acquires the instruction to suppress power generation, which is acquired by the instruction acquisition unit 11. Thereafter, the specifying unit 123 specifies an upper limit power generation output (W) of each power generation device 60. The upper limit power generation output of the power generation device 60 receiving the instruction to suppress power generation is an upper limit power generation output determined with the instruction to suppress power generation. The upper limit power generation output of the power generation device 60 not receiving the instruction to suppress power generation is, for example, a rated output. The second addition unit 124 calculates a sum of the upper limit power generation outputs of the plurality of power generation devices 60.

The specifying unit 123 may specify the upper limit power generation output of each of the plurality of power generation devices 60 for each unit period of time determined in the instruction to suppress power generation. Then, the second addition unit 124 may calculate "the sum of the upper limit power generation outputs of the plurality of power generation devices 60" for each unit period of time.

The addition unit 122 repeatedly calculates a difference (a total excess output) between the sum of the power generation outputs (the actually measured values) of the plurality of power generation devices 60 calculated by the first addition unit 121 and the sum of the upper limit power generation outputs of the plurality of power generation devices 60 calculated by the second addition unit 124 at a predetermined period T1. When the second addition unit 124 calculates "the sum of the upper limit power generation outputs of the plurality of power generation devices 60" for each unit period of time, the subtraction unit 122 calculates the total excess output using "the sum of the upper limit power generation outputs of the plurality of power generation devices 60" in a corresponding period of time.

The excess notification unit 14 repeatedly transmits the excess output information indicating the total excess output to the plurality of storage control devices 20 in the suppression period of time. The excess output information may be a value of the total excess output (W) calculated by the excess calculation unit 12 or may be a value obtained by normalizing the value. For example, a value obtained by dividing the total excess output (W) by a predetermined value N (a value equal to or larger than the upper limit of the total excess power (W): for example, a sum of rated outputs of all the power generation devices 60 which are suppression objects—a sum of the upper limit power generation outputs) may be set as the normalized value. The predetermined value N is the same value as the predetermined value N used to normalize the above-described sharing coefficient.

The excess notification unit 14 repeatedly transmits the excess output information the total excess output calculated repeatedly at the period T1 by the excess calculation unit 12 to the storage control device 20 at the same period.

The information transmitted to the plurality of storage control devices 20 has the same content. Therefore, the excess notification unit 14 can simultaneously transmit the excess output information to the storage control devices 20. A scheme of realizing the simultaneous transmission is, for example, broadcast or multicast, but the invention is not limited thereto.

Figure 15:
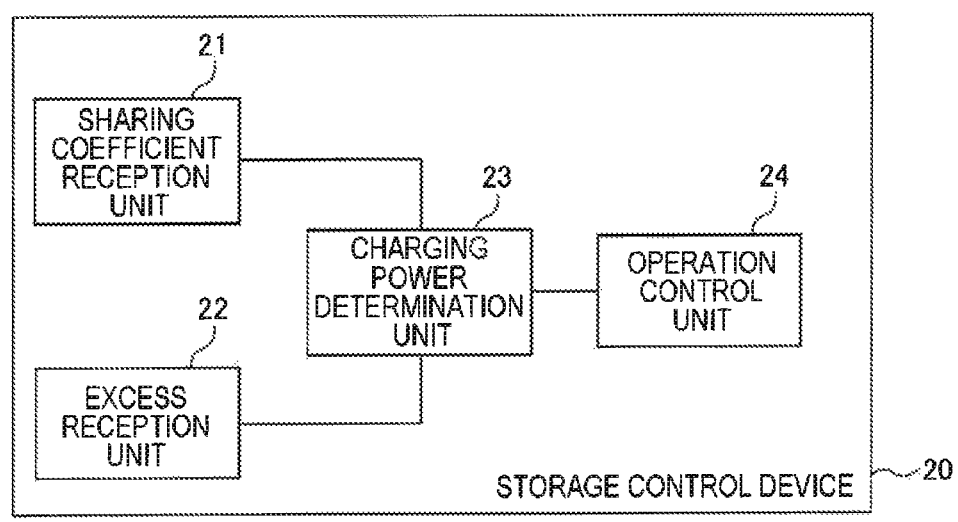
FIG. 15 is an exemplary functional block diagram illustrating a storage control device according to the example embodiment.

Next, the configuration of the storage control device 20 will be described. FIG. 15 is an exemplary functional block diagram illustrating the storage control device 20. As illustrated in the drawing, the storage control device 20 includes a sharing coefficient reception unit 21, an excess reception unit 22, a charging power determination unit 23, and an operation control unit 24. The sharing coefficient reception unit 21 and the excess reception unit 22 can perform communication via the same communication unit.

Figure 21:
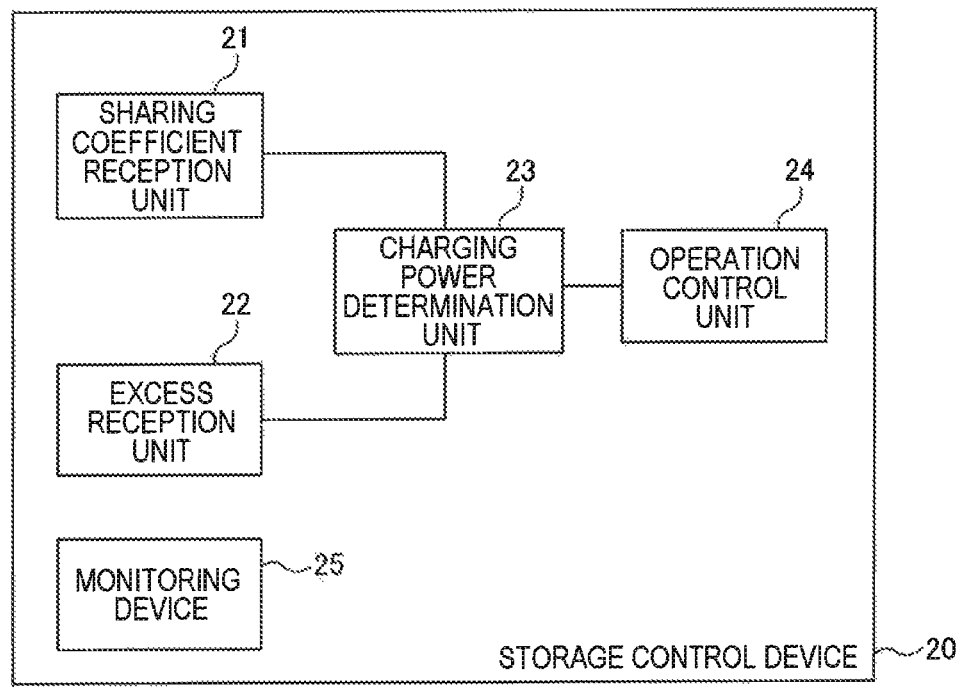
FIG. 21 is an exemplary functional block diagram illustrating the storage control device according to the example embodiment.

FIG. 21 is another exemplary functional block diagram illustrating the storage control device 20. The storage control device 20 illustrated in the drawing includes a sharing coefficient reception unit 21, an excess reception unit 22, a charging power determination unit 23, an operation control unit 24, and a monitoring device 25.

The sharing coefficient reception unit 21 receives the sharing coefficient individually transmitted to each of the plurality of storage control devices 20 by the sharing coefficient notification unit 15 before the excess absorbing process starts.

The excess reception unit 22 receives the excess output information simultaneously transmitted to the plurality of storage control devices 20 by the excess notification unit 14 in the suppression period of time. The excess reception unit 22 repeatedly receives the excess output information repeatedly transmitted at the period T1 by the excess notification unit 14.

The charging power determination unit 23 determines charging power and/or consumption power of the energy storage device 30 performing charging and/or consumption of the power of the total excess output on the basis of the sharing coefficient received by dm sharing coefficient reception unit 21 and latest excess output information received by the excess reception unit 22. When the excess reception unit 22 repeatedly receives the excess output information, the charging power determination unit 23 accordingly repeatedly determines charging power and/or consumption power.

For example, the sharing coefficient indicates the sharing ratio of each energy storage device 30 to the total excess power by percentage (for example, "0.05"). When the excess output information is the value (W) of the total excess output, the charging power determination unit 23 can determine a product of the total excess output and the sharing coefficient as the charging power (W)/consumption power (W). Similarly to the case of the example above in which the sharing coefficient is normalized with the predetermined value N, the charging power determination unit 23 can determine the product of the information (the value obtained by normalizing the total excess output) indicating the total excess output and the sharing coefficient as the charging power (w)/consumption power (W).

The operation control unit 24 controls the energy storage device 30 such that the excess absorbing process is performed in the suppression period of time. The operation control unit 24 causes the energy, storage device 30 to perform charging and/or consumption with the charging power and/or consumption power determined by the charging power determination unit 23. As described above, the charging power determination unit 23 repeatedly determines the charging power and/or consumption power during the suppression period of time. When the charging power determination unit 23 determines new charging power and/or consumption power, the operation control unit 24 causes the energy storage device 30 to perform charging and/or consumption with the newly determined charging power and/or consumption power.

The monitoring device 25 acquires (detects or measures) state information indicating the state of the energy storage device 30 and repeatedly transmits the state information to the control device 10. The state information is, for example, SOC, a vacant capacity (Wh), a charging amount (Wh), a voltage, a current, temperature, a storage energy amount, or error information.

Next, an example of a flow of a process of the power control system according to the example embodiment will be described with reference to the sequence diagram of FIG. 16.

First, the electricity transmission and distribution service provider system performs power demand prediction for the following one day, power generation prediction, or the like for the power generation devices 60 connected to the power system on the basis of attribute information (for example, weather forecast, a date, a day of week, and an event) of the following day. Then, on the basis of the prediction, necessity of power generation suppression, a period of time in which the power generation suppression is performed, a district in which the power generation suppression is performed, the power generation devices 60 as objects of the power generation suppression, a total amount of suppression (for each unit period of time), a suppression amount of each power generation device 60 (for each unit period of time), and the like are determined. Then, the electricity transmission and distribution service provider system transmits the instruction to suppress power generation for the following day to predetermined objects at a predetermined timing (for example, a predetermined time of the previous day).

The instruction to suppress power generation includes a suppression period of time and an upper limit power generation output for each unit period of time (see FIGS. 6 and 7).

Figure 16:
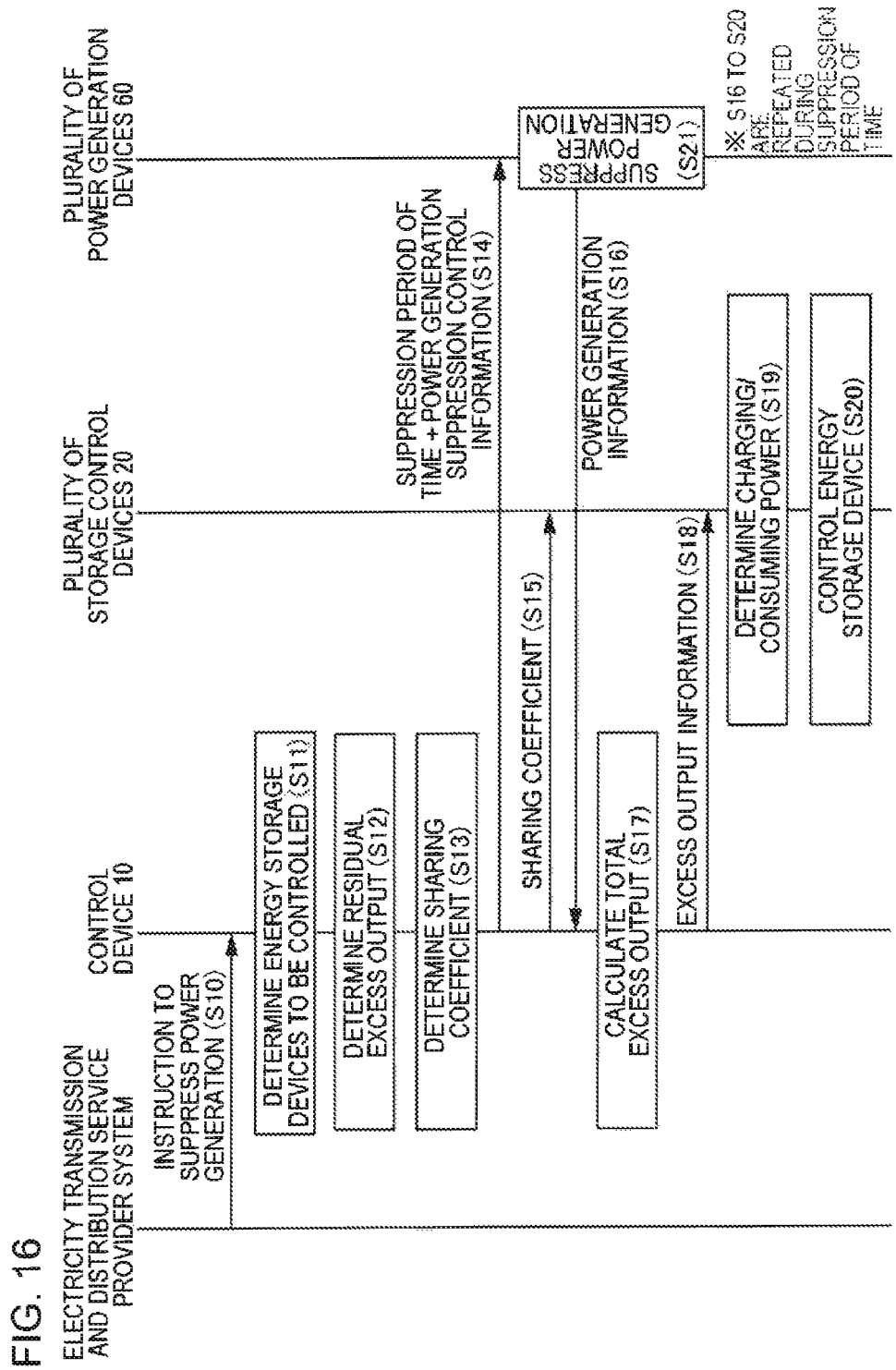
FIG. 16 is a sequence diagram illustrating an example of a flow of a process of the power control system according to the example embodiment.

In the sequence diagram of FIG. 16, the electricity transmission and distribution service provider system transmits the instruction to suppress power generation for the plurality of power generation devices 60 registered in the control device 10 to the control device 10. In this transmission example, when the instruction to suppress power generation, which is common to the plurality of power generation devices 60 illustrated in FIG. 7 is transmitted, the electricity transmission and distribution service provider system transmits information for identifying the power generation device 60 which is an object of the instruction to suppress power generation to the control device 10 in addition to the instruction to suppress power generation.

The electricity transmission and distribution service provider system may also transmit the instruction to suppress power generation to each of the plurality of power generation devices 60 which are power generation suppression objects. In this case, the instruction to suppress power generation is transmitted from each power generation device 60 to the control device 10 so that the control device 10 ascertains the content of the instruction to suppress power generation.

In S11, the control device 10 determines the energy storage devices 30 which participate in the excess absorbing process in response to the instruction to suppress power generation acquired in S10. A specific example of the determination process has been described above.

For example, the control device 10 may recruit the users managing the plurality of registered energy storage devices 30 so that the users participate in the excess absolving process. Then, the control device 10 may determine the energy storage devices 30 of the users who have expressed the participation as the energy storage devices 30 participating in the excess absorbing process. The order of S10 and S11 may be changed.

In step S12, the control device 10 calculates the residual excess output and/or the residual excess output amount which is not chargeable and/or consumable in the determined energy storage devices 30 on the basis of the instruction to suppress power generation acquired in S10 and the content determined in S11. The specific example of the calculation process has been described above.

When there is the residual excess output and/or the residual excess power amount, the control device 10 generates the power generation suppression control information for suppressing power generation equivalent to the calculated residual excess output and/or residual excess power amount for each power generation device 60. The specific example of the process has been described above.

In S13, the control device 10 determines the sharing coefficient for each of the energy storage devices 30 determined in S11. A specific example of the process of determining the sharing coefficient has been described above. The control device 10 can determine the sharing coefficient of each of the plurality of storage control devices 20 for each unit period of time of the suppression period of time.

In S14, the control device 10 transmits the power generation suppression control information generated in S12 to each of the plurality of power generation devices 60. The control device 10 may notify the plurality of power generation devices 60 of the suppression period of time.

When the residual excess output and/or the residual excess power amount is "0", the control device 10 may not transmit the power generation suppression control information in S14. Alternatively, power generation suppression control information indicating that the residual excess output and/or the residual excess power amount is "0" may be transmitted.

In S15, the control device 10 transmits the sharing coefficient of each of the plurality of energy storage devices 30 determined in S13 to the storage control device 20 controlling each of the energy storage devices 30 to be controlled.

The process described above is performed before the suppression period of time specified with the instruction to suppress power generation, which is acquired in S10. The process of S10 in the instruction to suppress power generation is assumed to be notified of in real time every minute or notified every several seconds rather than being notified of in advance. Accordingly, S15 is preferably performed before the suppression period of time, but may be performed in the beginning of the suppression period of time. In S15, when the instruction to suppress power generation arrives in real time in each suppression period of time (every minute or every several seconds), the sharing coefficients for a plurality of suppression periods of time (which may be the same coefficient) may be determined.

S16 to S21 to be described below are performed in the suppression period of time. In S21, each of the plurality of power generation devices 60 performs the power generation suppression (output suppression) based on the power generation suppression control. When the power generation suppression control information is not received or when the power generation suppression control information indicating that the residual excess output and/or the residual excess power amount is "0" is not received, the power generation device 60 continues the power generation without performing the power generation suppression (output suppression) even in the suppression period of time.

S16 to S20 to be described below are repeatedly performed during the suppression period of time.

In S16, each of the plurality of power generation devices 60 repeatedly transmits the actually measured value (the instantaneous value (W)) of the power generation of the power generation device 60 to the control device 10 at the period T1. For example, the output (W) of the power generation device 60 is measured at a measurement interval (for example, 400 msec) less than the period T1 and a representative value (for example, an average value, a maximum value, a minimum value, a mode, or a median value, or an integrated value during the period T1) of the plurality of actually measured values (W) obtained during the period T1 is transmitted to the control device 10.

The plurality of power generation devices 60 transmit the actually measured values of the power generation by shifting a timing by & time less then the period T1 so that mutually transmitted data is not congested.

In S17, the control device 10 repeatedly calculates the total excess output at the period T1. The total excess output is calculated on the basis of the actually measured value of the power generation of each of the plurality of power generation devices 60 acquired repeatedly in S16. A method of calculating the total excess output has been described above.

In S18, the control device 10 repeatedly transmits the excess output information indicating the total excess output to the plurality of storage control devices 20 at the period T1. The control device 10 can simultaneously transmit the excess output information to the plurality of storage control devices 20 using a scheme such as multicast.

In S19, each of the plurality of storage control devices 20 repeatedly determines charging power and/or consumption power of each storage control device 20 in the excess absorbing process on the basis of the sharing coefficient received in S15 and the excess output information (latest excess output information) received repeatedly in S18. The storage control device 20 determines new charging power and/or consumption power on the basis of new excess output information whenever the new excess output information is acquired.

For example, the sharing coefficient indicates the sharing ratio of each energy storage device 30 to the total excess output by percentage (for example, "0.05"). When the excess output information is the value (W) of the total excess output, the charging power determination unit 23 can determine a product of the total excess output and the sharing coefficient as the charging power (W)/consumption power (W).

When the sharing coefficient is determined for each unit period of time of the suppression period of time, the storage control device 20 determines the charging power and/or consumption power using the sharing coefficient of the unit period of time corresponding to a current time.

In S20, of the plurality of storage control devices 20 controls each of the plurality of energy storage devices 30 such that the charging and/or consumption of the latest charging power and/or consumption power determined in S19 is performed.

Next, a specific instance will be described according to the flow of FIG. 16.

In S10, the control device 10 acquires the instruction to suppress power generation. Herein, the control device 10 is assumed to acquire the instruction to suppress power generation, as illustrated in FIG. 7, for 10 power generation devices 60 with a rated output of 500 kW and 5 power generation devices 60 with a rated output of 400 kW. In this case, as illustrated in FIG. 8, the upper limit of the total excess output (W) and the upper limit of the total excess output amount (Wh) in each unit period of time is calculated. A calculation method has been described above.

Subsequently, in S11, the control device 10 determines the energy storage devices 30 participating in the excess absorbing process in response to the instruction to suppress power generation. Herein, 200 energy storage devices 30 which can be used to perform the excess absorbing process of an output of 5 kW and a capacity of 6 kWh and 100 energy storage devices 30 which can be used to perform the excess absolving process of an output of 4 kW and a capacity of 5 kWh are assumed to be determined (ensured). In this case, as illustrated in FIG. 9, the total output of the plurality of determined energy storage devices 30 is 1400 kW and the total capacity is 1700 kWh.

Subsequently, in S12, the control device 10 calculates the residual excess output and/or the residual excess power amount for each unit period of time. When there is the residual excess output and/or the residual excess power amount, the control device 10 generates the power generation suppression control information for suppressing power generation equivalent to the calculated residual excess output and/or residual excess power amount for each power generation device 60. Herein, as illustrated in FIG. 9, the calculation and the determination is assumed to be performed. A scheme for the calculation and the determination has been described above.

In S13, the control device 10 calculates the sharing coefficient of each of the plurality of energy storage devices 30. Herein, the sharing ratios of the determined 300 energy storage devices 30 are assumed to be equal. In this case, the sharing ratio (percentage) of each of the 300 energy storage devices 30 is 1/300. This value may be set to the sharing coefficient. Herein, a value obtained by normalizing this value is assumed to be the sharing coefficient.

In FIG. 17, a normalized value obtained by multiplying the sharing ratio (percentage) by the upper limit of the total excess output (W) in each unit period of time is illustrated as the sharing coefficient in each unit period of time. A different sharing coefficient for each energy storage device 30 may be determined.

In S14, the control device 10 transmits the power generation suppression control information to the plurality of power generation devices 60 on the basis of the content determined in S12. Herein, the output upper limit (a ratio to the rated output) in each unit period of time illustrated in FIG. 9 is transmitted.

In S15, the control device 10 transmits the sharing coefficient determined in S13 to each of the plurality of storage control devices 20.

In S21, the power generation device 60 performs the power generation suppression (output suppression) on the basis of the power generation suppression control information received in S14. The power generation device 60 acquiring the output upper limit (the ratio to the rated output) for each unit period of time illustrated in FIG. 9 controls the output in each unit period of time to the output upper limit or less illustrated in FIG. 9.

In S16, each of the plurality of power generation devices 60 repeatedly transmits the actually measured value (the instantaneous value (W)) of the power generation to the control device 10 at the period T1.

In S17, the control device 10 repeatedly calculates the total excess output at the period T1 on the basis of the date received in S16.

In S18, the control device 10 transmits the excess output information regarding the total excess output. Heroin, the control device 10 transmits a value (normalized value) obtained by dividing the total excess output calculated in S17 by the total excess output upper limit (see FIG. 17) in each unit period of time as the excess output information. The control device 10 can simultaneously transmit the excess output information to the plurality of storage control devices 20 using a scheme such as multicast.

In S19, each of the plurality of storage control devices 20 determines the charging power and/or the consumption power of each storage control device 20 in the excess absorbing process on the basis of the sharing coefficient received in S15 and the excess output information (latest excess output information) received repeatedly in S18. Specifically, the storage control device 20 determines a product of the normalized sharing coefficient and the normalized total excess output (the excess output information) as the charging power and/or the consumption power. The control device 20 determines new charging power and/or consumption power on the basis of new excess output information whenever the new excess output information is acquired.

In S20, each of the plurality of storage control devices 20 controls each of the plurality of energy storage devices 30 such that charging and/or consumption with the latest charging power and/or consumption power determined in S19 is performed.

According to the example embodiment, it is possible to realize the same operational effects as those of the first and second example embodiments. According to the example embodiment, it is possible to realize the following operational effects.

Figure 18:
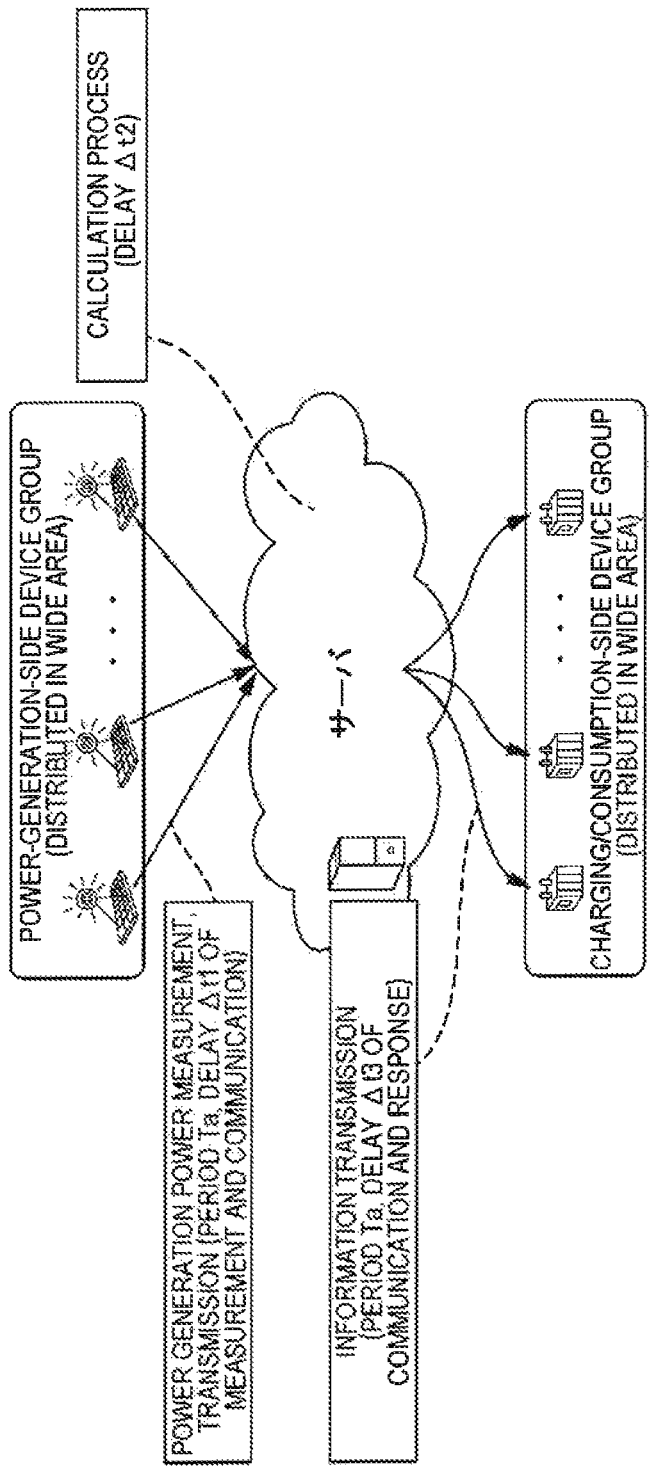
FIG. 18 is a diagram illustrating an overall picture of the power control system according to the example embodiment.

As illustrated in FIG. 18, the power control system according to the example embodiment includes a power-generation-side device group (the power generation devices 60 and the like) distributed in a wide area, a server (the control device 10), and a charging/consumption-side device group (the storage control devices 20, the energy storage devices 30, and the like) distributed in a wide area.

In this case, as illustrated in the drawing, a delay Δt1 of communication and measurement caused due to measurement of each of a plurality of power-generation-side devices and transmission of data from each device to a server occurs. In addition, a delay Δt2 of a process caused due to a calculation process in the server occurs. Further, a delay Δt3 of communication and response caused due to transmission of data from the server to the plurality of charging and/or consumption-side devices occurs.

Due to these delays, a time lag increases between a timing at which excess output flows reversely from the power generation devices 60 to the power system and a timing at which the energy storage devices 30 performs the charging and/or the assumption of the excess output.

In the power control system according to the example embodiment, it is possible to reduce the delay Δt3 of the communication and response. The description thereof will be made below.

In the example embodiment, the control device 10 (the server) determines the sharing coefficient of each of the plurality of energy storage devices 30 before the suppression period of time and transmits the sharing coefficient to the plurality of storage control devices 20 (the charging and/or consumption-side device group). Then, in the suppression period of time, the control device 10 repeatedly transmits the same data (the excess output information) to the plurality of storage control devices 20.

Since the sharing coefficient is transmitted before the suppression period of time, the sharing coefficient is not relevant to the delay Δt3 of the communication and response. Since the content of the excess output information transmitted to the storage control devices 20 is the same, the control device 10 can simultaneously transmits the excess output information to the plurality of supply and demand adjustment control devices 20. As a result, the delay Δt3 of the communication and response can be reduced more than when predetermined data is individually transmitted in sequence to the plurality of storage control devices 20.

In the power control system according to the example embodiment, it is possible to reduced delay Δt2 of the process. The description thereof will be made below.

In the power control system according to the example embodiment, during the suppression period of time, it is necessary to perform "a calculation process of calculating the total excess output on the basis of the actually measured values of the power generation" and "a calculation process of determining the charging power and/or consumption power of each energy storage device 30 on the basis of the calculated total excess output".

In the example embodiment, the control device 10 performs "the calculation process of calculating the total excess output on the basis of the actually measured values of the power generation" and each of the plurality of storage control devices 20 performs "the calculation process of determining the charging power and/or consumption power of each energy storage device 30 on the basis of the calculated total excess output".

That is, "the calculation process of determining the charging power and/or consumption power of each energy stooge device 30 on the basis of the calculated total excess output" is shared by the plurality of storage control devices 20. Then, each of the plurality of storage control devices 20 determines only the charging power and/or consumption power of the corresponding energy storage device 30. Therefore, the calculation process can be divided to each energy storage device 30 to be performed in parallel.

As a result, it is possible to reduce the delay Δt2 of the process more than when the control device 10 performs both the calculation processes.

According to the example embodiment, the charging power and/or the consumption power of each energy storage device 30 can be determined through a simple calculation process of multiplying the sharing coefficient by a value indicated by the excess output information. Therefore, it is possible to reduce an increase in a delay occurring in the calculation process executed by each of the storage control devices 20.

Fourth Example Embodiments

A power control system according to the example embodiment realizes further reduction in the delay Δt2 of the process described with reference to FIG. 18 with characteristics configurations of the control device 10 and the power generation device 60. The other remaining configurations of the storage control device 20 and the energy storage device are the same as those of the third example embodiment. Hereinafter, configurations of the power generation device 60 and the control device 10 will be described.

Each of the plurality of power generation devices 60 acquires the instruction to suppress power generation. For example, the control device 10 may transmit the instruction to suppress power generation acquired from the electricity transmission and distribution service provider system to each power generation device 60. In addition, the electricity transmission and distribution service provider system may transmit the instruction to suppress power generation to each power generation device 60. In any case, the instruction to suppress power generation is transmitted to the power generation devices 60 before the suppression period of time.

Each of the plurality of power generation devices 60 repeatedly calculates the excess output (W) on the basis of the actually measured value (W) of the power generation and the upper limit power generation output (W) in each unit period of time specified with the instruction to suppress power generation in the suppression period of time. The excess output is an excess output portion in the actually measured value of the power generation over the upper limit power generation output. When the actually measured value of the power generation output of each of the power generation devices 60 is a value less than the upper limit power generation output of each of the power generation devices 60, a difference from the upper limit power generation output is calculated as a negative value and is set as the negative excess output.

For example, each of the plurality of power generation devices 60 repeatedly measures a power generation output (instantaneous value (W)) at a predetermined measurement interval (for example, 400 msec) in the suppression period of time. Then, each of the plurality of power generation devices 60 repeatedly calculates the excess output on the basis of the actually measured value. Then, each of the plurality of power generation devices 60 repeatedly transmits the calculated excess output to the control device 10 at the period T1 (for example, a time interval (several seconds) longer than the measurement interval or the same time interval as the measurement interval).

When the period T1 is a time interval longer than the measurement interval, the power generation device 60 may calculate the excess output to be transmitted to the control device 10, using representative value (for example, an average value, a maximum value, a minimum value, a mode, a median value, or an integrated value during the period T1) of the plurality of measured values obtained during the period T1.

Figure 23:
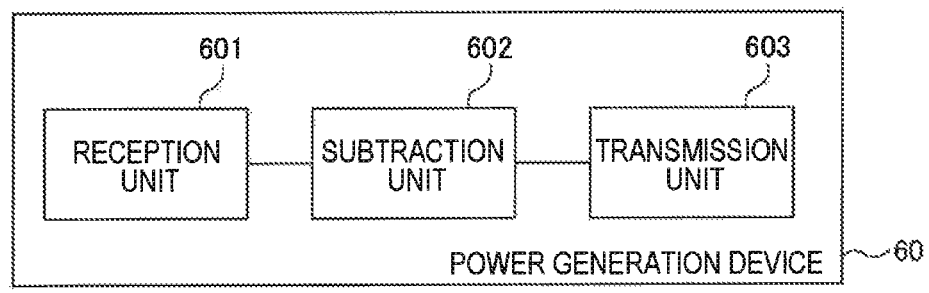
FIG. 23 is an exemplary functional block diagram illustrating a power generation device according to the example embodiment.

FIG. 23 is an exemplary functional block diagram illustrating the power generation device 60. A reception unit 601 receives the instruction to suppress power generation. A subtraction unit 602 repeatedly calculates the excess output by subtracting the upper limit power generation output from an actually measured value of power generation. The upper limit power generation output is specified on the basis of the instruction to suppress power generation. A transmission unit 603 repeatedly transmits the excess output calculated by the subtraction unit 602 to the control device 10.

An exemplary functional block diagram of the control device 10 is illustrated in FIG. 14, as in the third example embodiment. As illustrated in the drawing, the control device 10 includes the reception unit 111, the excess calculation unit 12, the sharing coefficient determination unit 13, the selection unit 17, the residual excess calculation unit 18, and the transmission unit 191. The control device 10 may further include the event detection unit 16. The reception unit 111 includes the instruction acquisition unit 11. The transmission unit 191 includes the excess notification unit 14, the sharing coefficient notification unit 15, and the power generation suppression control information transmission unit 19. The residual excess unit 18 includes the first calculation unit 181 and the second calculation unit 182. The excess notification unit 14, the sharing coefficient notification unit 15, and the power generation suppression control information transmission unit 19 can perform communication via the same communication unit.

The configurations of the reception unit 111, the event detection unit 16, the selection unit 17, the residual excess calculation unit 18, the power generation suppression control information transmission unit 19, the sharing coefficient determination unit 13, the excess notification unit 14, and the sharing coefficient notification unit 15 are the same as those of the first to third example embodiments.

The excess calculation unit 12 receives information indicating an excess output from each of the plurality of power generation devices 60. Then, the excess calculation unit 12 calculates the total excess output by adding up the excess outputs of the plurality of power generation devices 60.

According to the above-described example embodiment, it is possible to realize the same operational effects as those of the first to third example embodiments. According to the example embodiment, it is possible to reduce the delay Δt2 of the process described with reference to FIG. 18.

To calculate the total excess output, it is necessary to perform "a process of calculating the excess output of each power generation device 60" and "a process of adding up the excess outputs of the power generation devices 60".

In the example embodiment, each of the plurality of power generation devices 60 performs "the process of calculating the excess output of each power generation device 60" and the control device 10 performs "the process of adding up the excess outputs of the power generation devices 60". That is, "the process of calculating the excess output of each power generation device 60" is shared by the plurality of power generation devices 60.

Therefore, it is possible to reduce the delay Δt2 of the process more than when the control device 10 performs both the calculation processes.

Fifth Example Embodiments

In the power control system according to the example embodiment, the control device 10 has a function of predicting a total excess output for a subsequent period on the basis of a past total excess output and transmitting the predicted total excess output to the plurality of storage control devices 20. The configurations of the storage control device 20, the energy storage device 30, and the power generation device 60 are the same as those of the first to fourth example embodiments.

An exemplary functional block diagram of the control device 10 is illustrated in FIG. 14, as in the third and fourth example embodiments. As illustrated in the drawing, the control device 10 the reception unit 111, the excess calculation unit 12, the sharing coefficient determination unit 13, the selection unit 17, the residual excess calculation unit 18, and the transmission unit 191. The control device 10 may further include the event detection unit 16. The reception unit 111 includes the instruction acquisition unit 11. The transmission unit 191 includes the excess notification unit 14, the sharing coefficient notification unit 15, and the power generation suppression control information transmission unit 19. The residual excess calculation unit 18 includes the first calculation unit 181 and the second calculation unit 182. The excess notification unit 14, the sharing coefficient notification unit 15, and the power generation suppression control information transmission unit 19 can perform communication via the same communication unit.

The configurations of the reception unit 111, the event detection unit 16, the selection unit 17, the residual excess calculation unit 18, the power generation suppression control information transmission unit 19, the sharing coefficient determination unit 13, and the sharing coefficient notification unit 15 are the same as those of the first to fourth example embodiments.

The excess calculation unit 12 calculates a predicted value of total excess output for a subsequent period an tee basis of the newly calculated total excess output and previously calculate total excess output. The excess calculation unit 12 can adopt every prediction method.

For example, a prediction model may be generated by performing machine learning using a plurality of pieces of training data in which certain total excess output is set as a target variable and chronological data obtained by arranging total excess output corresponding to immediately previous N times (where N is an integer equal to or greater than 1) in calculation order is set as a description variable. Then, a predicted value may be obtained by inputting to the prediction model chronological data in which total excess output corresponding to N times including the newly calculated total excess output is arranged in calculation order.

In addition, a linear expression (prediction expression) may be calculated in a graph in which the horizontal axis represents a time and the vertical axis represents total excess output using total excess output newly calculated at t1 and total excess output calculated at t0, immediately prior to t1. Then, the predicted value may be obtained by inputting a time t2 of a subsequent period to the linear expression.

The excess notification unit 14 transmits a predicted value of total excess output of a subsequent period calculated on the basis of the total excess output calculated by the excess calculation unit 12 as excess output information to the plurality of storage control devices 20 instead of the total excess output calculated by the excess calculation unit 12.

According to the above-described example embodiment, it is possible to realize the same operational effects as those of the first to fourth example embodiments. According to the example embodiment, the control device 10 can estimate the total excess output of the subsequent period and notify the storage control device 20 of the total excess output. In particular, since the excess output is estimated with regard to a total value of the plurality of power generation devices 60, an averaging effect can be expected and an abrupt output fluctuation can be alleviated. As a result, it is possible to estimate the more accurate excess output. As described above, it is possible to reduce the problem of the time lag between a timing at which excess output is supplied from the power generation devices 60 to the power system and a timing at which the energy storage devices 30 performs the charging and/or the consumption of the excess output, and thus it is possible to sufficiently decrease a fluctuation in a supply and demand balance caused in the time lag.

In the case of the present example embodiment, when the configurations of the third and fourth example embodiments can be provided, as described in these example embodiments, it is possible to reduce the delay Δt2 of the process and the delay Δt3 of the communication and response. Therefore, it is possible to reduce a period from measurement of the output of the power generation device 60 to the determination of the charging and/or consumption power of the energy storage device 30 based on the measured value. As a result; it is easy to predict the total excess output for the subsequent period, and thus it is possible to improve estimation precision.

Sixth Example Embodiments

The control device 10 of the power control system according to the example embodiment repeatedly acquires information indicating state of each of the plurality of energy storage devices 30 in the suppression period of time and repeatedly determines the sharing coefficient of each of the plurality of energy storage devices 30 on the basis of the state information. Then, the control device 10 repeatedly transmits the repeatedly determined sharing coefficient to each storage control device 20. Since a sufficiently long calculation time is necessary for the process of redetermining the sharing coefficient, the period Ta at which the sharing coefficient is transmitted is longer than the period Tb (the period T1 described in third to fifth example embodiments) at which the excess output information is transmitted.

The configurations of the energy storage device 30, the power generation device 60, and the are the same as those of the first to fifth example embodiments.

Figure 22:
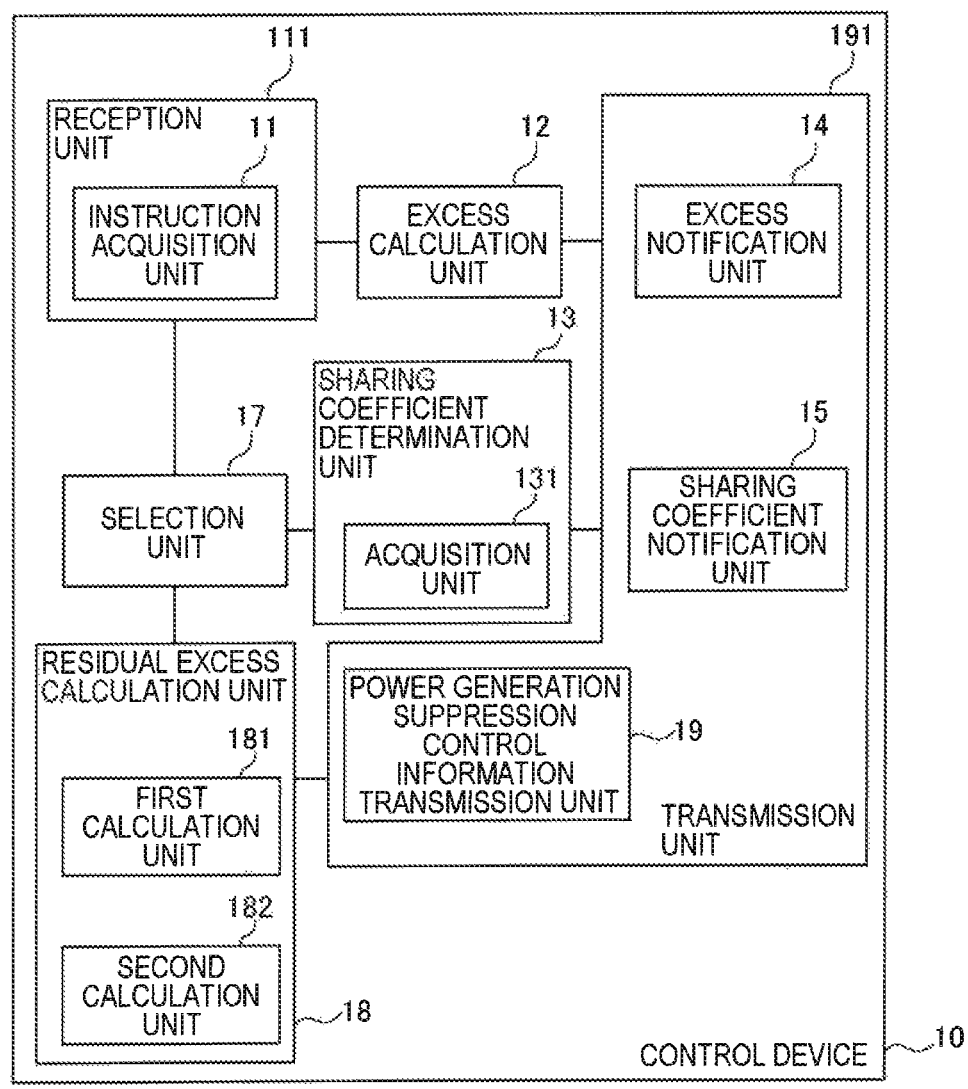
FIG. 22 is an exemplary functional block diagram illustrating the control device according to the example embodiment.

An exemplary functional block diagram of the control device 10 is illustrated in FIG. 22. As illustrated in the drawing, the control device 10 includes the reception unit 111, the excess calculation unit 12, the sharing coefficient determination unit 13, the selection unit 17, the residual excess calculation unit 18, and the transmission unit 191. The control device 10 may further include the event detection unit 16. The reception unit 111 includes the instruction acquisition unit 11. The transmission unit 191 includes the excess notification unit 14, the sharing coefficient notification unit 15, and the power generation suppression control information transmission unit 19. The residual excess calculation unit 18 includes the first calculation unit 181 and the second calculation unit 182. The sharing coefficient determination unit 13 includes an acquisition unit 131. The excess notification unit 14, the sharing coefficient notification unit 15, and the power generation suppression control information transmission unit 19 can perform communication via the same communication unit.

The configurations of the reception unit 111, the event detection unit 16, the selection unit 17, the residual excess calculation unit 18, the power generation suppression control information transmission unit 19, the excess calculation unit 12, and the excess notification unit 14 are the same those of the first to fifth example embodiments.

The sharing coefficient determination unit 13 repeatedly determines the sharing coefficient of each of the plurality of energy storage devices 30 in the suppression period of time (while the energy storage devices 30 are performing the absorbing process).

The acquisition unit 131 of the sharing coefficient determination unit 13 repeatedly acquires information indicating a state of each of the plurality of energy storage devices 30. For example, the reception unit 111 repeatedly acquires the information indicating the state of each of the plurality of energy storage devices 30 from each of the plurality of storage control devices 20. Then, the acquisition unit 131 acquires the information from the reception unit 111. The information indicating the state of the energy storage device 30 is, for example, a state of charge (SOC), a vacant capacity (Wh), a charging amount (Wh), a voltage, a current, temperature, a storage energy amount, or error information.

Then, the sharing coefficient determination unit 13 redetermines the sharing coefficient of each of the plurality of energy storage devices 30 on the basis of information (for example, SOC, a vacant capacity (Wh), or a charging amount (Wh)) indicating the state of each of the plurality of energy storage devices 30. That is, the sharing coefficient determination unit 13 redetermines the sharing coefficient (the sharing ratio) appropriate to each energy storage device 30 according to the latest state of each of the plurality of energy storage devices 30.

For example, the coefficient determination unit 13 may determine a larger sharing ratio for the energy storage device 30 having lower SOC. In addition, the sharing coefficient determination unit 13 may determine a larger sharing ratio for the energy storage device 30 having a larger vacant capacity. When SOC or the charging amount (Wh) is received, the sharing coefficient determination unit 13 may calculate the vacant capacity (Wh) of each energy storage device 30 on the basis of the information and the rated capacity of each, energy storage device 30 registered in advance.

The sharing coefficient notification unit 15 repeatedly transmits the sharing coefficient of each of the plurality of energy storage devices 30 to the plurality of storage control devices 20 in the suppression period of time (while the energy storage devices 30 are performing the absorbing process). The period Ta at which the sharing coefficient is transmitted is longer than a period Tb (the period T1 described in the third to fifth example embodiments) at which the excess notification unit 14 transmits the excess output information. Ta is, for example, in the range from several minutes to tens of minutes and Tb is, for example, several seconds.

An exemplary functional block diagram of the storage control device 20 is illustrated in FIG. 15. As illustrated in the drawing, the storage control device 20 includes the sharing coefficient reception unit 21, the excess reception unit 22, the charging power determination unit 23, and the operation control unit 24. The configurations of the excess reception rout 22 and the operation control anil 24 are the same as those of the third to fifth example embodiments.

The sharing coefficient reception unit 21 repeatedly receives the sharing coefficient of the corresponding energy storage device 30 in the suppression period of time (while the energy storage devices 30 are performing the absorbing process). The period Ta at which the sharing coefficient is received is longer than the period Tb (the period T1 described in the third to fifth example embodiments) at which the excess reception unit 22 receives the excess output information. Ta is, for example, in the range from several minutes to tens of minutes and Tb is, for example, several seconds.

The charging power determination unit 23 determines control content on the basis of the latest sharing coefficient received by the sharing coefficient reception unit 21 and the latest excess output information received by the excess reception unit 22. For example, the charging power determination unit 23 can determine the charging power and/or consumption power of the energy storage device 30 in accordance with the same scheme as that of the third to fifth example embodiments.

According to the above-described example embodiment, it is possible to realize the operational effects as those of the first to fifth example embodiments. According to the example embodiment, it is possible to determine the sharing ratio of each energy storage device according to the latest state of each energy storage device 30 that performs the absorbing process.

For example, even when a use condition determined by a manager of the energy storage device 30 allows the use of up to 5 kWh a situation in which the capacity is not ensured in the energy storage device 30 can occur because the manager forgets discharging or the like. When the manager forgets that the energy storage device 30 is performing the absorbing process and charging mid discharging is controlled by operation on the side of the energy storage device 30, a situation in which the capacity is not usable can occur. Due to state abnormality such as overvoltage, overcurrent, an increase in temperature of the energy storage device 30, or the like, other error information, short-circuiting of a communication path, a situation in which the capacity is not usable can occur.

According to the example embodiment, on the basis of not only the use condition determined by the manager but also a latest state (for example, SOC) of each energy storage device 30, the sharing coefficient can be redetermined in the suppression period of time. Therefore, even when the above-described unexpected situation occurs, the sharing coefficient (the sharing ratio) can be redetermined according to the situation. As a result, even when the above-described unexpected situation occurs, it is possible to appropriately absorb the total excess output.

In the example embodiment, the period Ta at which the information indicating the state of the energy storage device 30 is acquired and the sharing coefficient is determined and transmitted can be set to be greater then the period Tb at which the excess output information is transmitted. Since the state of the energy storage device 30 is rarely changed considerably in a short time, the relatively long period can be set. By suppressing a transmission or reception frequency of information for detecting the state of the energy storage device 30 or a transmission or reception frequency of the sharing coefficient, it is possible to reduce a processing load of the system.

Seventh Example Embodiments

In the first to sixth example embodiments, when the residual excess output and/or the residual excess power amount occurs, the control device 10 generates the power generation suppression control information for performing the power generation suppression (output suppression) equivalent to the residual excess output and/or the residual excess power amount before the suppression period of time and transmits the power generation suppression control information to each power generation device 60 (S14 of FIG. 16). On the other hand, the control device according to the example embodiment is different in that power generation suppression control information is generated on the basis of a power generation situation of each power generation device 60 during the suppression period of time and is transmitted to each power generation device 60 (for example, the power generation suppression control information is transmitted between S17 and S18 of FIG. 16). The power generation device 60 according to the example embodiment is different from the power generation device 60 according to the first to sixth example embodiments in that the power generation suppression (output suppression) is performed on the basis of the power generation suppression control information received from the control device 10 in the suppression period of time. The configuration of the energy storage system 31, the other remaining configuration of the control device 10, and the other remaining configuration of the power generation device 60 are the same as those of the first to sixth example embodiments.

The reception unit 111 (see FIG. 3) of the control device 10 acquires the power generation relevant information (the power generation result or the power generation output (W)) from each power generation device 60 during the suppression period of time in real time. The reception unit 111 performs a process of acquiring the power generation relevant information as in the process described in the third example embodiment. In the third example embodiment, the process in which the reception unit 111 acquires the information for the process of causing the energy storage device 30 to perform charging and/or consumption of the total excess output has been described.

When the third example embodiment is combined with the example embodiment, the power generation relevant information acquired by the reception unit 111 is used for both the process described in the third example embodiment (the process of causing the energy storage device 30 to perform the charging and/or consumption of the total excess output) and the process described in the example embodiment (the process of causing the power generation device 60 to suppress a predetermined output).

On the basis of the content of the instruction to suppress power generation (the upper limit power generation output (W)), the power generation result (W) of each power generation device 60 received by the reception unit 111, and the content determined by the selection unit 17 before the suppression period of time (the energy storage device 30 performing the excess absorbing process), the residual excess calculation unit 18 calculates whether the residual excess output (W) occurs and, when the residual excess output occurs, a value of the residual excess output in real time during the suppression period of time.

Then, when the residual excess output (W) occurs, the residual excess calculation unit 18 determines the power generation device 60 suppressing the output of the residual excess output (W).

Specifically, when the residual excess output (W) occurs, the residual excess calculation unit 18 determines the power generation device 60 of which the power generation result (W) is greater dura the upper limit power generation output (W) as a power generation suppression object (output suppression object). That is, the power generation device 60 of winch the power generation result (W) is not greater than the upper limit power generation output (W) is not the power generation suppression object (output suppression object).

The transmission unit 191 transmits information for specifying the content (the sharing ratio or the like) of the power generation suppression (output suppression) to the power generation device 60 determined as the power generation suppression object (output suppression object) by the residual excess calculation unit 18 in real time during the suppression time of time. The transmission unit 191 may transmit the information to all the power generation devices 60 in real time.

The plurality of power generation devices 60 calculates the power generation suppression content (output suppression content) of the power generation devices on the basis of the information received from the control device 10. Then, the output of the power is suppressed according to the calculated content.

When the transmission unit 191 transmits the information only to the power generation device 60 determined as the power generation suppression object (output suppression object), the power generation device 60 receiving the information determines that the power generation device is the power generation suppression object (output suppression object). Then, the power generation suppression content (the output suppression content) of the power generation device is on the basis of the information received from the control device 10 and the output of the calculated power is suppressed.

On the other hand, when the transmission unit 191 transmits the information to all the power generation devices 60, the power generation devices 60 receiving the information determine whether the power generation devices are the power generation suppression objects (output suppression objects) on the basis of magnitude relations between the power generation results of the power generation devices and the upper limit power generation outputs (W). When the power generation result of the power generation device is greater than the upper limit power generation output (W), the power generation device determines that the power generation device is the power generation suppression object (output suppression object). Conversely, when the power generation result of the power generation device is equal to or less than the upper limit power generation output (W), the power generation device determines that the power generation device is not the power generation suppression object (output suppression object). The power generation device 60 determining that the power generation device is the power generation suppression object (output suppression object) calculates the power generation suppression content (output suppression content) of the power generation device on the basis of the information received from the control device 10 and suppresses the output of the calculated power;

Hereinafter, a specific example will be described.

Now, the number of power generation devices 60 of the renewable energy power sources (photovoltaic power generation), is assumed to be N. A number n is assigned to the N power generation devices 60 as IDs. Then, a rated output P(n) of each power generation device 60, an upper limit power generation output U(n) of each power generation device 60 indicated in the instruction to suppress power generation, and a power generation result m(n) of each power generation device 60 at a certain time point during the suppression period of time are assumed. U(n) and m(n) are assumed to be expressed at ratios to the rated output.

In this case, under the instruction to suppress power generation, the power generation output (W) permitted m all the N power generation devices 60 is expressed with $\Sigma P(n) \times U(n)$.

Then, the power generation result (W) of the power generation device 60 at a certain time point daring the suppression period of time is expressed with $P(n) \times m(n)$.

The residual excess calculation unit 18 of the control device 10 performs calculation divided into power less than the upper limit power generation output and power equal to or greater than the upper limit power generation output as follows.

"Power Less than Upper Limit Power Generation Output"

The power generation device 60 of (m(n) ... U(n)<0) is extracted and $M = \Sigma P(n) \times \{m(n) - U(n)\}$ is performed on the extracted power generation device 60.

"Power Equal to or Greater than, the Upper Limit Power Generation Output"

The power generation device 60 of (m(n)-U(n)≥0) is extracted and $I = \Sigma P(n) \times \{m(n) - U(n)\}$ is performed on the extracted power generation device 60.

Then, when M+I is equal to or less then 0, the residual excess calculation unit 18 determines that the residual excess output (W) docs not occur.

Conversely, when (M+I) is greater than 0, the residual excess calculation unit 18 determines whether the residual excess output (W) occurs on the basis of a situation of ensuring the energy storage devices 30 and the value of (M+I).

Herein, the selection unit 17 is assumed to determine that R energy storage devices 30 perform the excess absorbing process from the length of the suppression period of time and a situation of a vacant capacity (Wh) of the energy storage devices. A number r is assigned to the R energy storage devices 30 as IDs. Then, a rated output Q(r) of PCS of each energy storage device 30 and an output upper limit Z(r) in the excess absorbing process planned in advance are assumed. Z(r) is assumed to be expressed at a ratio to the rated output.

In this case, the output upper limit (W) of all the R energy storage devices 30 is expressed with $\Sigma Q(r) \times Z(r)$.

The residual excess calculation unit 18 performs magnitude comparison between (M+I) and $\Sigma Q(r) \times Z(r)$ when (M+I) is greater than 0.

When (M+I) is greater than $\Sigma Q(r) \times Z(r)$, it is determined that the residual excess output (W) occurs. Then, the residual excess calculation unit 18 calculates a residual excess output $J = (M+I) - \Sigma Q(r) \times Z(r)$. Conversely, when (M+I) is equal to or greater than $\Sigma Q(r) \times Z(r)$, it is determined that the residual excess output (W) does not occur.

When it is determined that the residual excess output (W) does not occur, the residual excess calculation unit 18 determines the power generation suppression content (output suppression content) for the plurality of power generation devices 60. The residual excess calculation unit 18 according to the example embodiment determines the power generation devices 60 satisfying (m(n)-U(n)≥0) as the power generation suppression targets (output suppression objects). The power generation devices 60 satisfying (m(n)-U(n)<0) are not determined as the power generation suppression objects (output suppression objects).

The residual excess calculation unit 18 calculates a ratio R(n)=[P(n)×{m(n)-U(n)}]/I of a surplus of each power generation device 60 to I in each of the power generation devices 60 determined as the power generation suppression objects (output suppression objects). Then, the ratio is determined as the sharing ratio of each power generation device 60.

In this case, each of the power generation devices 60 determined as the power generation suppression objects (output suppression objects) performs power generation suppression (output suppression) equivalent to J×R(n)=P(n)×m'(n).

Here, m'(n)=J×R(n)/P(n)={J×[P(n)×{m(n)-U(n)}]/I}P(n)=J×[m(n)-U(n)]/I   (Expression 1)

The transmission unit 191 simultaneously transmits I and J to the plurality of power generation devices 60. The content of I and J transmitted to the plurality of power generation devices 60 is the same.

The power generation device 60 receiving I and J determines whether the power generation device is the power generation suppression object (output suppression object) on the basis of a magnitude relation between m(n) and U(n) of the power generation device. When m(n)-U(n)<0, it is determined that the power generation device is not the power generation suppression object (the output suppression object). In contrast, when m(n) . . . U(n)≥0, it is determined that the power generation device is the power generation suppression object (the output suppression object).

The power generation device 60 that determines that the power generation device is the power generation suppression object (output suppression object) calculates m'(n) on the basis of m(n) and U(n) of the power generation device and Expression (1) and suppresses output equal to or greater than the value using the ratio to the rated output expressed (m(n)-m'(n)) as the output upper limit.

In the meantime, the energy storage device 30 performs the energy storage process under the control of the control device 10 as in the first to sixth example embodiments.

A specific example is shown as a reference in Tables 1 and 2. Table 1 shows a power generation result or the like at a certain moment of six power generation devices 60 to be managed. Table 2 shows information regarding four power generation devices 60 determined as the power suppression objects on the basis of a phenomenon shown in Table 1.

TABLE 1

| No. | P(n) [kW] | m(n) | U(n) | Current power [kW] | Difference from upper limit [kW] | M and I [kW] | Σ Q(r) * Z(r) [kW] | J[kW] | m'(n) [kW] |
|---|---|---|---|---|---|---|---|---|---|
| 1 | 100 | 0.4 | 0.6 | 40  | −20 | −40  | 105 | 100 | — |
| 2 | 200 | 0.5 | 0.6 | 100 | −20 |      |     |     | — |
| 3 | 300 | 0.7 | 0.6 | 210 | +30 | +245 |     |     | 0.040816 |
| 4 | 400 | 0.8 | 0.6 | 320 | +80 |      |     |     | 0.081633 |
| 5 | 250 | 0.9 | 0.6 | 225 | +75 |      |     |     | 0.122449 |
| 6 | 150 | 1.0 | 0.6 | 150 | +60 |      |     |     | 0.163265 |

TABLE 1

| No. | P(n) [kW] | m(n) | U(n) | Current power [kW] | Difference from upper limit [kW] | M and I [kW] | Σ Q(r) * Z(r) [kW] | J [kW] | m'(n) [kW] |
|---|---|---|---|---|---|---|---|---|---|
| 1 | 100 | 0.4 | 0.6 | 40  | −20 | −40  | 105 | 100 | — |
| 2 | 200 | 0.5 | 0.6 | 100 | −20 |      |     |     | — |
| 3 | 300 | 0.7 | 0.6 | 210 | +30 | +245 |     |     | 0.040816 |
| 4 | 400 | 0.8 | 0.6 | 320 | +80 |      |     |     | 0.081633 |
| 5 | 250 | 0.9 | 0.6 | 225 | +75 |      |     |     | 0.122449 |
| 6 | 150 | 1.0 | 0.6 | 150 | +60 |      |     |     | 0.163265 |

Figure 24:
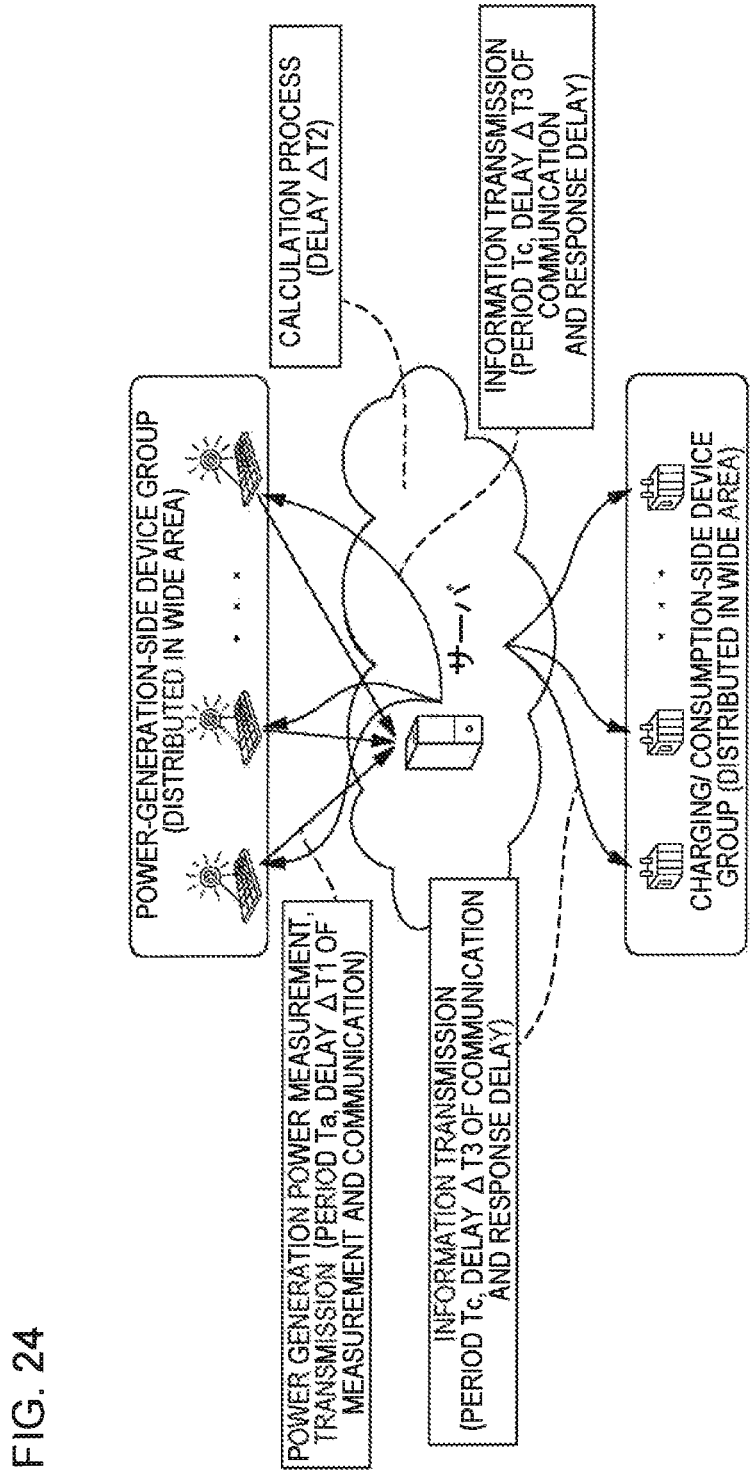
FIG. 24 is a diagram illustrating an overall picture of the power control system according to the example embodiment.

Here, a difference from the third example embodiment (FIG. 18) will be described with reference to FIG. 24. From FIGS. 18 and 24, it can be understood that there is the difference in that "information transmission" directed to the power-generation-side device group from the server is added. This "information transmission" indicates simultaneous transmission of I and J by the above-described transmission unit 191. As illustrated in FIG. 24, the server (the control device 10) according to the example embodiment simultaneously transmits predetermined information to the power-generation-side device group (the power generation devices 60 and the like) and the charging/consumption-side device group (the storage control devices, the energy storage devices 30, and the like) during the suppression period of time.

As illustrated in FIG. 24, the power-generation-side device group (the power generation devices 60 and the like) repeatedly transmits the power generation power at the period Ta during the suppression period of time and repeatedly receives information repeatedly transmitted from the server at a period Tc. Therefore, it is preferable to provide a method of reducing congestion of data. For example, the devices repeatedly transmitting the power generation power to the power generation devices 60 and the devices receiving information transmitted repeatedly from the server may be separately installed or another method may be provided. Ta and Tc illustrated in FIG. 24 may be the same value or may be different from each other.

The first to sixth example embodiments may be combined with the example embodiment. That is, in conformity with the first to sixth example embodiments, the control device 10 may generate the power generation suppression control information before the suppression period of time and may transmit the power generation suppression control information to each power generation device 60. Then, the control device 10 may switch the process to the process of the seventh example embodiment according to detection of a predetermined event occurring in the suppression period of time.

As described above, in the example embodiment, when the total excess output by which the power generation output is equal to or greater than the upper limit power generation output (the power generation output is calculated as a negative value when the power generation output is less than the upper limit power generation output) in each of the plurality of power generation devices 60 may not be consumed in the plurality of energy storage devices 30, that is, when there is the residual excess power information (the residual excess output and/or the residual excess power amount), the power generation suppression control information based on the residual excess power information is transmitted to the plurality of power generation devices and the power generation suppression (output suppression) is performed in the power generation devices.

In the example embodiment, the excess output by which the power generation output is greater than the upper limit power generation output is calculated for the power generation device 60 of which the power generation output is equal to or greater than the upper limit power generation output, and the ratio of the excess output to the total excess output in the plurality of power generation devices 60 of which the power generation output is equal to or greater than the upper limit power generation output is calculated for each power generation device 60. Then, when the power generation suppression control information simultaneously transmitted to the plurality of power generation devices 60 is received, each power generation device 60 calculates a share of the power generation suppression in the power generation device 60 on the basis of a magnitude of the ratio using the power generation suppression control information and performs the power generation suppression.

Specifically, the control device 10 simultaneously transmits the power generation suppression control information based on the residual excess power information and the total excess output in the plurality of power generation devices of which the power generation output is equal to or greater than the upper limit power generation output, to the plurality of power generation devices 60. Each power generation device 60 receives the power generation suppression control information and the total excess output in the plurality of power generation devices of which the power generation output is equal to or greater than the upper limit power generation output. The power generation device 60 calculates the excess output by which the power generation output is greater than the upper limit power generation output. Then, each power device 60 calculates a ratio of the excess output of the power generation device to the total excess output in the plurality of power generation devices of which the power generation output is equal to or greater than the received upper limit power generation output, allocates the power generation suppression control information to the power generation devices 60 based on the magnitude of the ratio, and performs the power generation control (output suppression).

That is, power generation device 60 calculates the ratio as which power generation is suppressed in the power generation device in the power generation suppression control information and performs the power generation suppression. In other words, each power generation device 60 sets the sharing coefficient (ratio) on the basis of the excess output of each power generation device 60 to the total excess output which is the excess output in all the plurality of power generation devices 60 of which the power generation output is equal to or greater than the upper limit power generation output. Then, each power generation device 60 performs the power generation control (output suppression) allocated to the power generation device 60 on the basis of the sharing coefficient set for each power generation device 60 and the power generation suppression control information shared by ail the plurality of power generation devices 60.

According to the example embodiment, the control device 10 can simultaneously transmit the total excess output and the power generation suppression control information in the plurality of power generation devices of which the power generation output is equal to or greater than the upper limit power generation output which is the same information in the plurality of power devices 60. Therefore, the control device 10 can reduce delay caused in the process of calculating the allocation of the power generation suppression control information on the basis of the excess output of each power generation device. This is because the ratio (the sharing coefficient) at which the power generation suppression is performed by the power generation device 60 with respect to the power generation suppression control information is calculated on the side of the power generation device 60.

As a modification example of the example embodiment, the control device 10 may calculate the excess output by which the power generation output is greater than the upper limit power generation output in each power generation device 60 when the control device 10 monitors (detects or acquires) the power generation relevant information of the power generation output or the of each power generation device 60. Then, the control device 10 may calculate the sharing coefficient (ratio) of each power generation device 60 on the basis of the total excess output of the plurality of power generation devices 60 of which the power generation output is equal to or greater than the upper limit power generation output and the excess output of each power generation device 60. Then, the control device 10 may calculate the power generation suppression control information of each power generation device 60 on the basis of the sharing coefficient (ratio) of each power generation device 60 and the power generation suppression control information. Then, the control device 10 may transmit the power generation suppression information calculated individually for each power generation device 60. That is, the control device 10 may calculate the share of the power generation suppression in the power generation device 60 on the basis of the magnitude of the sharing coefficient (ratio) with respect to the power generation suppression control information and may transmit the power generation suppression information calculated individually for each power generation device 60.

In this case, since the control device 10 calculates the power generation suppression control information on the basis of the excess output of the power generation device 60 and transmits the individual power generation suppression information to each power generation device 60, the delay of the process on the side of the power generation device 60 is reduced.

Figure 25:
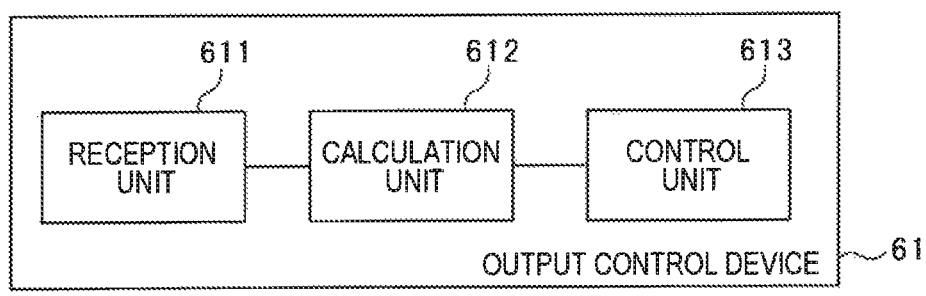
FIG. 25 is an exemplary functional block diagram illustrating the control device according to the example embodiment.

FIG. 25 is an exemplary functional block diagram illustrating the output control device 61 (the power generation control device) according to the example embodiment. As illustrated in the drawing, the output control device 61 includes a reception unit 611, a calculation unit 612, and a control unit 613.

The reception unit 611 receives the power suppression control information and information indicating that the total excess output of the plurality of power generation devices 60 of which the power generation output is equal to or greater than the upper limit power generation output. The calculation unit 612 calculates an excess output which is a difference between the actually measured value of the power generation output and the upper limit power generation output. The control unit 613 controls the power generation output on the basis of the total excess output, the excess output, and the power generation suppression control information.

The control unit 613 can control the power generation output cm the basis of a magnitude of the ratio of the excess output to the total excess output or a magnitude of the excess output. For example, the control unit 613 may increase the power generation suppression value in the power generation device 60 as the excess output is larger. Alternatively, the control unit 613 may increase the power generation suppression value in the power generation device 60 as the ratio of the excess output to the total excess output is largest. The total excess output is a sum of excesses of actually measured values of the power generation outputs equal to or greater than the upper limit power generation output in each of the plurality of power generation devices 60.

Finally, an example of a hardware configuration of the device (foe control device, the storage control device, the energy storage device, and the output control device) described in the example embodiment will be described. Each unit included in the device according to the example embodiment is configured in any combination of software and hardware of any computer, focusing on a central processing unit (CPU), a memory, a program loaded to the memory, a memory unit such as a hard disk storing the program (a program downloaded from a memory medium such as a compact disc (CD) or server or the like on the Internet in addition to a program stored from the stage of shipment of the device in advance), and a network connection interface. It should be apparent to those skilled in the art that various modification examples of the configuration method and the device are made.

FIG. 1 is a block diagram illustrating an example of a hardware configuration of a device according to the example embodiment. As illustrated in FIG. 1, the device includes a processor 1A, a memory 2A, an input and output interface 3A, a peripheral circuit 4A, and a bus 5A. The peripheral circuit includes various modules.

The bus 5A is a data transmission path along which the processor 1A, the memory 2A, the peripheral circuit 4A, and the input and output interface 3A transmit and receive data one another. The processor 1A is, for example, an arithmetic processing device such as a central processing unit (CPU) or a graphics processing unit (GPU). The memory 2A is, for example, a memory such as a random access memory (RAM) or a read-only memory (ROM). The input and output interface 3A includes an interface along which information is acquired from an external device, an external server, an external sensor, or the like. The processor 1A gives an instruction to each module and performs an arithmetic operation on the basis of a calculation result.

Hereinafter, examples of reference forms are supplemented.

A control device including:

a first calculation unit that calculates a total excess output in a plurality of power generation devices based on power generation relevant information and upper limit of power generation output in each of the plurality of power generation devices;

a second calculation unit that calculates residual excess power information based on the total excess output and storage relevant information in a plurality of energy storage devices absorbing the total excess output; and a transmission unit that calculates power generation suppression control information based on residual excess power information and transmits the power generation suppression control information to each of the plurality of power generation devices.

The control device in which the transmission unit claculates the power generation suppression control information for each of the plurality of power generation devices based on the power generation relevant information and the upper limit power generation output in the power generation device and transmits the power generation suppression control information.

The control device in which the power generation relevant information is a predicted value of a power generation output, and in which the transmission unit calculates the power generation suppression control information for each of the plurality of power generation devices based on the predicted value of the power generation output and upper limit power generation output in the power generation device and transmits the power generation suppression control information.

The control device described in the transmission unit transmits the power generation suppression control information set so that a power generation suppression value in the power generation device is larger as output equal to or greater than the upper limit power generation output in the predicted value of the power generation output is larger.

The control device described in which the transmission unit transmits the power generation suppression control information to the power generation device of which the predicted value of the power generation output is equal to or greater than the upper limit power generation output.

The control device in which the power generation relevant information is an actually measured value of a power generation output, and in which the transmission unit calculates the power generation suppression control information for each of the plurality of power generation devices based on the actually measured value of the power generation output and the upper limit power generation output in the power generation device and transmits the power generation suppression control information.

The control device which the transmission unit transmits the power generation suppression control information set so that a power generation suppression value in the power generation device is larger as output equal to or greater than the upper limit power generation output in the actually measured value of the power generation output is larger.

The control device in which the transmission unit transmits the power generation suppression control information to the power generation device of which the actually measured value of the power generation output is equal to or greater than the upper limit power generation output.

The control device in which the transmission unit transmits the power generation suppression control information allocated based on a ration of an excess output of each power generation device, by which a predicted value or an actually measured value is equal to or greater than the upper limit power generation output, to the total excess output in the plurality of power generation devices of which a predicted value or on actually measured value of power generation output is equal or greater than the upper limit power generation output.

The control device in which the transmission unit simultaneously transmits information indicating the total excess output and the power generation suppression control information to the plurality of power generation devices.

The control device further including:

a reception unit that receives the upper limit power generation output for each unit period of time of each of the plurality of power generation devices, in which the transmission unit transmits the power generation suppression control information calculated each unit period of time of each of the plurality of power generation devices.

The control device further including:

a reception unit that receives an excess output for each unit period of time of each of the plurality of power generation devices, in which the transmission unit transmits the power generation suppression control information calculated for each unit period of time to each the plurality of power generation devices.

The control device in which the reception unit receives a suppression period of time, in which the second calculation unit calculates the residual excess power information before the suppression period of time, and in which the transmission unit transmits the power generation suppression control information before the suppression period of time.

The control device in which the transmission unit increases a value of the power generation suppression control information as a value of the residual excess power information is larger.

The control device further including:

an event detection unit that detects occurrence of an event changing content of the power generation suppression control information during the suppression period of time, in which the second calculation unit updates the residual excess power information based on the detected event, and in which the transmission unit transmits the power generation suppression control information based on the updated residual excess power information to each of the plurality of power generation devices.

The control device in which the second calculation unit calculates a residual excess power amount based on a power amount absorbed by the plurality of energy storage devices for each unit period of time, and in which the event detection unit detects occurrence of the event in which a total excess output amount in previous unit period of time is less than a power amount absorbed by the plurality of energy storage devices.

The control device in which the second calculation unit updates the power amount absorbed by the plurality of energy storage devices for each unit period of time, by adding a value which is obtained by subtracting the total excess output amount in all plurality of power generation devices for the previous unit period of time from the power amount absorbed by the plurality of energy storage devices for the previous unit period of time to the power amount absorbed by the plurality of energy storage devices for a subsequent unit period of time.

The control device in which the second calculation unit updates the residual excess power information, by adding a value which is obtained by subtracting the total excess output amount in all the plurality of power generation devices for the previous unit period of time from the power amount absorbed by the plurality of energy storage devices for the previous unit period of time to the power amount absorbed by the plurality of energy storage devices for a subsequent unit period of time, and in which transmission unit transmits the power generation suppression control information based on the updated residual excess power information to each of the plurality of power generation devices.

The control device in which the event detection unit detects the event in which some of the plurality of energy storage devices cannot absorb the total excess output.

The control device in which the second calculation unit updates power amount absorbed by the plurality of energy storage devices for each unit period of time in response to detection of the event.

The control device in which the second calculation unit updates the residual excess power amount based on the power amount absorbed by the plurality of energy storage devices for each unit periods of time in response to detection of the event, and in, which the transmission unit transmits the power generation suppression control information based on the updated residual excess power information to each of the plurality of power generation devices.

The control device described further comprising:

a selection unit that selects the plurality of energy storage devices absorbing the total excess output for each unit time based on the storage relevant information.

The control device in which the upper limit power generation output is set for each unit period of time, and in which the selection unit selects the energy storage devices for each unit period of time.

The control device in which the upper limit power generation output is set for each unit period of time and the plurality of energy storage devices are selected, and in which the second calculation unit calculates the residual excess power information for each unit period of time.

A power generation control device including:

a reception unit that receives information indication a total excess output in a plurality of power generation devices of which a power generation output is equal to or greater than an upper limit power generation output and power generation suppression control information;

a calculation unit that calculates an excess output which is a difference between an actually measured value of the power generation output and the upper limit power generation output; and a control unit that controls the power generation output based on the total excess output, the excess output, and the power generation suppression control information.

The power generation control device in which the control unit controls the power generation output based on a magnitude of a ratio of the excess output to the total excess output or a magnitude of the excess output.

The power generation control device in which the control unit increases a power generation suppression value in the power generation device as the excess output is larger.

The power generation control device in which the control unit increases the power generation suppression value in the power generation device as a ration of the excess output to the total excess output is larger.

The power generation control device in which the total excess output is a sum of excess of actually measured values of power generation outputs equal to or greater than upper limit power generation outputs in the plurality of power generation devices.

A system including:
the control device; and
the power generation control device.

A control method executed by a computer, the method including:
a first calculation step of calculating a total excess output in a plurality of power generation output in each of the plurality of power generation devices;
a second calculation step of calculating residual excess power information based on the total excess output and storage relevant information in a plurality of energy storage devices absorbing the total excess output; and
a transmission step of transmitting power generation suppression control information to each of the plurality of power generation devices based on the residual excess power information.

A program causing a computer to function as:
a first calculation unit that calculates a total excess output in a planarity of power generation devices based on power generation relevant information and an upper limit power generation output in each of the plurality of power generation devices;
A second calculation unit that calculates residual excess power information based on the total excess output and storage relevant information in a plurality of energy storage devices absorbing the total excess output; and
a transmission unit that transmits power generation suppression control information to; each of the plurality of power generation devices based on the residual excess power information.

The invention claimed is:

1. A control device comprising:
a first calculation unit that calculates a total excess output, which is an amount by which a sum of measured values of power generation outputs (W) of a plurality of power generation devices is greater than a sum of upper limit power generation outputs of the plurality of power generation devices, based on power generation relevant information and the upper limit power generation output in each of the plurality of power generation devices;
a second calculation unit that calculates residual excess power information, which indicates at least one of power (W) and a power amount (Wh) which is not chargeable or consumable in a plurality of energy storage devices, based on the total excess output and storage relevant information in the plurality of energy storage devices absorbing the total excess output; and
a transmission unit that calculates power generation suppression control information based on the residual excess power information and transmits the power generation suppression control information to each of the plurality of power generation devices.

2. The control device according to claim 1,
wherein the transmission unit calculates the power generation suppression control information for each of the plurality of power generation devices based on the power generation relevant information and the upper limit power generation output in the power generation device and transmits the power generation suppression control information.

3. The control device according to claim 2,
wherein the power generation relevant information is a predicted value of a power generation output, and
wherein the transmission unit calculates the power generation suppression control information for each of the plurality of power generation devices based on the predicted value of the power generation output and the upper limit power generation output in the power generation device and transmits the power generation suppression control information.

4. The control device according to claim 3,
wherein the transmission unit transmits the power generation suppression control information to the power generation device of which the predicted value of the power generation output is equal to or greater than the upper limit power generation output.

5. The control device according to claim 2,
wherein the power generation relevant information is an actually measured value of a power generation output, and
wherein the transmission unit calculates the power generation suppression control information for each of the plurality of power generation devices based on the actually measured value of the power generation output and the upper limit power generation output in the power generation device and transmits the power generation suppression control information.

6. The control device according to claim 5,
wherein the transmission unit transmits the power generation suppression control information to the power generation device of which the actually measured value of the power generation output is equal to or greater than the upper limit power generation output.

7. The control device according to claim 1,
wherein the transmission unit transmits the power generation suppression control information allocated based on a ratio of an excess output of each power generation device, by which a predicted value or an actually measured value is equal to or greater than the upper limit power generation output, to the total excess output in the plurality of power generation devices of which a predicted value or an actually measured value of power generation output is equal to or greater than the upper limit power generation output.

8. The control device according to claim 1,
wherein the transmission unit simultaneously transmits information indicating the total excess output and the power generation suppression control information to the plurality of power generation devices.

9. The control device according to claim 1, further comprising:
a reception unit that receives the upper limit power generation output for each unit period of time of each of the plurality of power generation devices,
wherein the transmission unit transmits the power generation suppression control information calculated for each unit period of time to each of the plurality of power generation devices.

10. The control device according to claim 1, further comprising:
a reception unit that receives an excess output for each unit period of time of each of the plurality of power generation devices, wherein the transmission unit transmits the power generation suppression control information calculated for each unit period of time to each of the plurality of power generation devices.

11. The control device according to claim 9,
wherein the reception unit receives a suppression period of time,
wherein the second calculation unit calculates the residual excess power information before the suppression period of time, and
wherein the transmission unit transmits the power generation suppression control information before the suppression period of time.

12. The control device according to claim 11, further comprising:
an event detection unit that detects occurrence of an event changing content of the power generation suppression control information during the suppression period of time,
wherein the second calculation unit updates the residual excess power information based on the detected event, and
wherein the transmission unit transmits the power generation suppression control information based on the updated residual excess power information to each of the plurality of power generation devices.

13. The control device according to claim 12,
wherein the second calculation unit calculates a residual excess power amount based on a power amount absorbed by the plurality of energy storage devices for each unit period of time, and
wherein the event detection unit detects occurrence of the event in which a total excess output amount in a previous unit period of time is less than a power amount absorbed by the plurality of energy storage devices.

14. The control device according to claim 13,
wherein the second calculation unit updates the power amount absorbed by the plurality of energy storage devices for each unit period of time, by adding a value which is obtained by subtracting the total excess output amount in all the plurality of power generation devices for the previous unit period of time from the power amount absorbed by the plurality of energy storage devices for the previous unit period of time to the power amount absorbed by the plurality of energy storage devices for a subsequent unit period of time.

15. The control device according to claim 13,
wherein the second calculation unit updates the residual excess power information, by adding a value which is obtained by subtracting the total excess output amount in all the plurality of power generation devices for the previous unit period of time from the power amount absorbed by the plurality of energy storage devices for the previous unit period of time to the power amount absorbed by the plurality of energy storage devices for a subsequent unit period of time, and
wherein the transmission unit transmits the power generation suppression control information based on the updated residual excess power information to each of the plurality of power generation devices.

16. The control device according to claim 13,
wherein the event detection unit detects the event in which some of the plurality of energy storage devices cannot absorb the total excess output.

17. The control device according to claim 1, further comprising:
a selection unit that selects the plurality of energy storage devices absorbing the total excess output for each unit time based on the storage relevant information.

18. The control device according to claim 17,
wherein the upper limit power generation output is set for each unit period of time, and
wherein the selection unit selects the energy storage devices for each unit period of time.

19. The control device according to claim 1,
wherein the upper limit power generation output is set for each unit period of time and the plurality of energy storage devices are selected, and
wherein the second calculation unit calculates the residual excess power information for each unit period of time.

* * * * *